United States Patent
Wang

(10) Patent No.: US 9,325,992 B2
(45) Date of Patent: Apr. 26, 2016

(54) SIGNALING OF CLOCK TICK DERIVATION INFORMATION FOR VIDEO TIMING IN VIDEO CODING

(71) Applicant: QUALCOMM Incorporated, San Diego, CA (US)

(72) Inventor: Ye-Kui Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 224 days.

(21) Appl. No.: 14/061,215

(22) Filed: Oct. 23, 2013

(65) Prior Publication Data

US 2014/0192902 A1    Jul. 10, 2014

Related U.S. Application Data

(60) Provisional application No. 61/749,866, filed on Jan. 7, 2013.

(51) Int. Cl.
*H04N 7/12* (2006.01)
*H04N 11/02* (2006.01)
(Continued)

(52) U.S. Cl.
CPC ....... *H04N 19/00884* (2013.01); *H04N 19/149* (2014.11); *H04N 19/44* (2014.11); *H04N 19/46* (2014.11); *H04N 19/70* (2014.11); *H04N 19/85* (2014.11)

(58) Field of Classification Search
CPC .. H04N 21/4305; H04N 7/50; H04N 21/4347
USPC ............... 375/240.01, 240.26, 240.28
See application file for complete search history.

(56) References Cited

U.S. PATENT DOCUMENTS

2010/0091882 A1    4/2010 Luo et al.
2010/0195738 A1    8/2010 Zhu et al.
(Continued)

FOREIGN PATENT DOCUMENTS

TW    200637280    10/2006
TW    200913716 A    3/2009
(Continued)

OTHER PUBLICATIONS

Bross et al, "High Efficiency Video Coding (HEVC) tex specification draft 9", Joint Collaborative Team on Video Coding (JCT-VC) of ITU-T SG16 WP3 and ISO/IEC JTC1/SC29/WG11, 11th meeting: Shanghai, CN, Oct. 10-19, 2012.*

(Continued)

*Primary Examiner* — Chikaodili E Anyikire
(74) *Attorney, Agent, or Firm* — Shumaker & Sieffert, P.A.

(57) ABSTRACT

In an example, the disclosure provides for receiving a coded video sequence comprising encoded pictures of a video sequence and receiving timing parameters for the coded video sequence that include a time scale and a number of units in a clock tick at most once in a video parameter set (VPS) syntax structure referenced by the coded video sequence and at most once in a video usability information (VUI) part of a sequence parameter set (SPS) syntax structure referenced by the coded video sequence. Another example provides for encoding pictures of a video sequence to generate a coded video sequence and signaling timing parameters for the coded video sequence by at least in part signaling a time scale and a number of units in a clock tick at most once in a VPS syntax structure and at most once in a VUI part of a SPS syntax structure.

48 Claims, 10 Drawing Sheets

(51) Int. Cl.
H04N 11/04 (2006.01)
H04N 19/70 (2014.01)
H04N 19/46 (2014.01)
H04N 19/149 (2014.01)
H04N 19/44 (2014.01)
H04N 19/85 (2014.01)

(56) References Cited

U.S. PATENT DOCUMENTS

2011/0002397 A1 1/2011 Wang et al.
2012/0099643 A1 4/2012 Karegoudar
2013/0135431 A1 5/2013 Chen et al.
2014/0192901 A1 7/2014 Wang
2014/0192903 A1 7/2014 Wang

FOREIGN PATENT DOCUMENTS

TW 201018248 A 5/2010
TW 201032597 A 9/2010

OTHER PUBLICATIONS

Bross, et al., "Editors' Proposed Corrections to HEVC version 1," Joint Collaborative Team on Video Coding (JCT-VC) of ITU-T SG16 WP3 and ISO/IEC JTC1/SC29/WG11, 13th Meeting, Incheon, KR, Apr. 2013, 309 pp.
Bross, et al., "High Efficiency Video Coding (HEVC) text specification draft 10 (for FDIS & Consent)," Joint Collaborative Team on Video Coding (JCT-VC) of ITU-T SG 16 WP 3 and ISO/IEC JTC 1/SC 29/WG 11, Document: JCTVC-L1003_v13, 12th Meeting: Geneva, CH, Jan. 14-23, 2013, 331 pp.
Bross et al., "High efficiency video coding (HEVC) text specification draft 10 (For FDIS & Last Call)," 12th Meeting: Geneva, CH, Jan. 14-23, 2013, JCTVC-L1003_v34, 310 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 11-20, 2012, JCTVC-J1003_d7, 261 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 9," 11th Meeting: Shanghai, CN, Oct. 10-19, 2012, JCTVC-K1003_v7, 290 pp.
Bross et al., "Proposed editorial improvements for High Efficiency Video Coding (HEVC) text specification draft 9 (SoDIS", Joint Collaborative Team on Video Coding (JCT-VC) of ITUT SG 16 WP 3 and ISO/IEC JTC 1/SC 29/WG 11, Document: JCTVC-K1003_v7, Oct. 10-19, 2012, 290 pp.
Bross et al., "WD4: Working Draft 4 of High-Efficiency Video Coding," 6th Meeting: JCTVC-F803_d2, Torino, IT, Jul. 14-22, 2011, 226 pp.
Bross et al., "WD5: Working Draft 5 of High-Efficiency Video Coding," 7th Meeting: Geneva, Switzerland, Nov. 21-30, 2011, JCTVC-G1103_d2, 214 pp.
Chen, et al., "3D-HLS: Video parameter set for 3D-HEVC", JCT-3V Meeting; MPEG Meeting; Jul. 16-20, 2012; Stockholm; (The Joint Collaborative Team on 3D Video Coding Extension Development of ISO/IEC JTC1/SC29/WG11 and ITU-T SG.16); URL: http://phenix.int-evry.fr/jct2/,No. JCT3V-A0099, XP030130098, 15 pp.
Chou, et al., "A generalized hypothetical reference decoder for H.264/AVC," IEEE Transactions on Circuits and Systems for Video Technology, IEEE Service Center, Piscataway, NJ, US, vol. 13, No. 7, Jul. 1, 2003, XP011099259, pp. 674-687.
Deshpande, et al., "An Improved Hypothetical Reference Decoder for HEVC," Proc. SPIE 8666, Visual Information Processing and Communication IV, Feb. 21, 2013, pp. 866608-1 to 866608-9, vol. 8666.
Haque et al., "Simplifications of HRD Parameters for Temporal Scalability", JCT-VC Meeting; MPEG Meeting; Jul. 11-20, 2012; Stockholm; (Joint Colloborative Team on Video Coding of ISO/IEC JTC1/SC29/WG11 and ITU-T SG.16); URL: http://eftp3.itu.int/av-arch/jtcvc-site/, No. JCTVC-J0272, XP030112634, 7 pp.
Haque, et al., "AHG10: VUI and HRD syntax designs agreed by the BoG on VPS and NUH", JCT-VC Meeting; MPEG Meeting; Jul. 11-20, 2012; Stockholm; (Joint Colloborative Team on Video Coding of ISO/IEC JTC1/SC29/WG11 and ITU-T SG.16 ); URL: http://wftp3.itu.int/av-arch/jctvc-site/ No. JCTVC-J0548, XP030112910, 5 pp.
International Search Report and Written Opinion from International Application No. PCT/US2013/077283, dated Mar. 19, 2014, 16 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Wang, et al., "AHG9: On video parameter set," JCT-VC Meeting; MPEG Meeting; Oct. 10, 2012-Oct. 19, 2012; Shanghai; (Joint Collaborative Team on Video Coding of ISO/IEC JTC1/SC29/WG11 and ITU-T SG.16); URL: http://wftp3.itu.int/av-arch/jctvc-site/,, No. JCTVC-K0125, XP030113007, 7 pp.
Webb, "HRD Conformance for Real-time H.264 Video Encoding", Image Processing, Sep. 16-Oct. 19, 2007. ICIP 2007. IEEE International Conference On, IEEE, PI, XP031158546, ISBN: 978-1-4244-1436-9, pp. V-305-V-308.
Wiegand et al., "WD1: Working Draft 1 of High-Efficiency Video Coding", JCTVC-C403, 3rd Meeting: Guangzhou, CN, Oct. 7-15, 2010, 137 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Wang "AHG9: On fixed_pic_rate_flag", JCT-VC Meeting; MPEG Meeting; Jul. 11-20, 2012, Stockholm; (Joint Colloborative Team on Video Coding of ISO/IEC JTC1/SC29/WG11 and ITU-T SG.16); URL: http://eftp3.itu.int/av-arch/jctvc-site/, No. JCTVC-J0570, XP030112932, 4 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
Second Written Opinion from International Application No. PCT/US2013/077283, dated Dec. 22, 2014, 4 pp.
Taiwan Search Report from Taiwanese Application No. TW103100409, dated Apr. 28, 2015.

\* cited by examiner

SIGNALING OF CLOCK TICK DERIVATION INFORMATION FOR VIDEO TIMING IN VIDEO CODING

This application claims the benefit of U.S. Provisional Application No. 61/749,866, filed Jan. 7, 2013, the entire content of which is incorporated herein by reference.

TECHNICAL FIELD

This disclosure relates to video coding and video processing, and more particularly to techniques for signaling timing information in video information.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction utilizes a predictive block. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

A given coded video sequence encoded to a bitstream includes an ordered sequence of coded pictures. In the H.264/AVC and HEVC standards, the decoding order of the coded pictures for a bitstream is equivalent to the ordered sequence. However, the standards also support an output order of decoded pictures that differs from the decoding order, and in such cases each of the coded pictures is associated with a picture order count (POC) value that specifies the output order for the picture in the video sequence.

Video timing information for a video sequence may be signaled in syntax elements of one or more syntax structures (alternatively referred to as "parameter set structures" or simply "parameter sets"). The syntax structures may include a sequence parameter set (SPS) that includes coding information that applied to all slices of a coded video sequence. The SPS may itself include parameters referred to as video usability information (VUI), which include hypothetical reference decoder (HRD) information as well as information for enhancing the use of the corresponding video sequence for various purposes. The HRD information may itself be signaled using a HRD syntax structure includable within other syntax structures such as the VUI syntax structure. The syntax structures may also include a video parameter set (VPS) that describes characteristics of a corresponding video sequence, such as common syntax elements shared by multiple layers or operation points as well as other operation point information that may be common to multiple sequence parameter sets, such as HRD information for various layers or sub-layers.

SUMMARY

In general, this disclosure describes techniques for video coding, and more particularly to techniques for signaling timing information, e.g., to specify picture output timing and/or to define a buffering model such as a hypothetical reference decoder (HRD). In some examples, the techniques may include generating, for a coded video sequence, an encoded bitstream to signal the time scale and the number of units in a clock tick at most once in each of the video parameter set (VPS) syntax structure and video usability information (VUI) part of the sequence parameter set (SPS) syntax structure for the coded video sequence. That is, in some examples, in a given VPS syntax structure for a coded video sequence, the VPS syntax structure may include the time scale and number of units in a clock tick syntax elements at most once. Likewise in some examples, in a given VUI syntax structure (e.g., the VUI part of an SPS syntax structure) for a coded video sequence, the VUI syntax structure may include the time scale and number of units in a clock tick syntax elements at most once.

In one example of the disclosure, a method of processing video data includes receiving a coded video sequence comprising encoded pictures of a video sequence and receiving timing parameters for the coded video sequence that include a time scale and a number of units in a clock tick at most once in a video parameter set (VPS) syntax structure referenced by the coded video sequence and at most once in a video usability information (VUI) part of a sequence parameter set (SPS) syntax structure referenced by the coded video sequence.

In another example of the disclosure, a method of encoding video data includes encoding pictures of a video sequence to generate a coded video sequence comprising the encoded pictures and signaling timing parameters for the coded video sequence by at least in part signaling a time scale and a number of units in a clock tick at most once in a video parameter set (VPS) syntax structure and at most once in a video usability information (VUI) part of a sequence parameter set (SPS) syntax structure.

In another example of the disclosure, a device for processing video data includes a processor configured to receive a coded video sequence comprising encoded pictures of a video sequence and receive timing parameters for the coded video sequence that include a time scale and a number of units in a clock tick at most once in a video parameter set (VPS) syntax structure referenced by the coded video sequence and at most once in a video usability information (VUI) part of a sequence parameter set (SPS) syntax structure referenced by the coded video sequence.

In another example of the disclosure, a device for encoding video data includes a processor configured to encode pictures of a video sequence to generate a coded video sequence comprising the encoded pictures and signal timing parameters for the coded video sequence by at least in part signaling a time scale and a number of units in a clock tick at most once in a video parameter set (VPS) syntax structure and at most once in a video usability information (VUI) part of a sequence parameter set (SPS) syntax structure.

In another example of the disclosure, a device for processing video data includes means for receiving a coded video sequence comprising encoded pictures of a video sequence and means for receiving timing parameters for the coded video sequence that include a time scale and a number of units in a clock tick at most once in a video parameter set (VPS) syntax structure referenced by the coded video sequence and at most once in a video usability information (VUI) part of a sequence parameter set (SPS) syntax structure referenced by the coded video sequence.

In another example, the disclosure describes a computer-readable storage medium. The computer-readable storage medium having stored thereon instructions that upon execution cause one or more processors to receive a coded video sequence comprising encoded pictures of a video sequence and receive timing parameters for the coded video sequence that include a time scale and a number of units in a clock tick at most once in a video parameter set (VPS) syntax structure referenced by the coded video sequence and at most once in a video usability information (VUI) part of a sequence parameter set (SPS) syntax structure referenced by the coded video sequence.

The details of one or more examples are set forth in the accompanying drawings and the description below. Other features, objects, and advantages will be apparent from the description and drawings, and from the claims.

DETAILED DESCRIPTION

Figure 1:
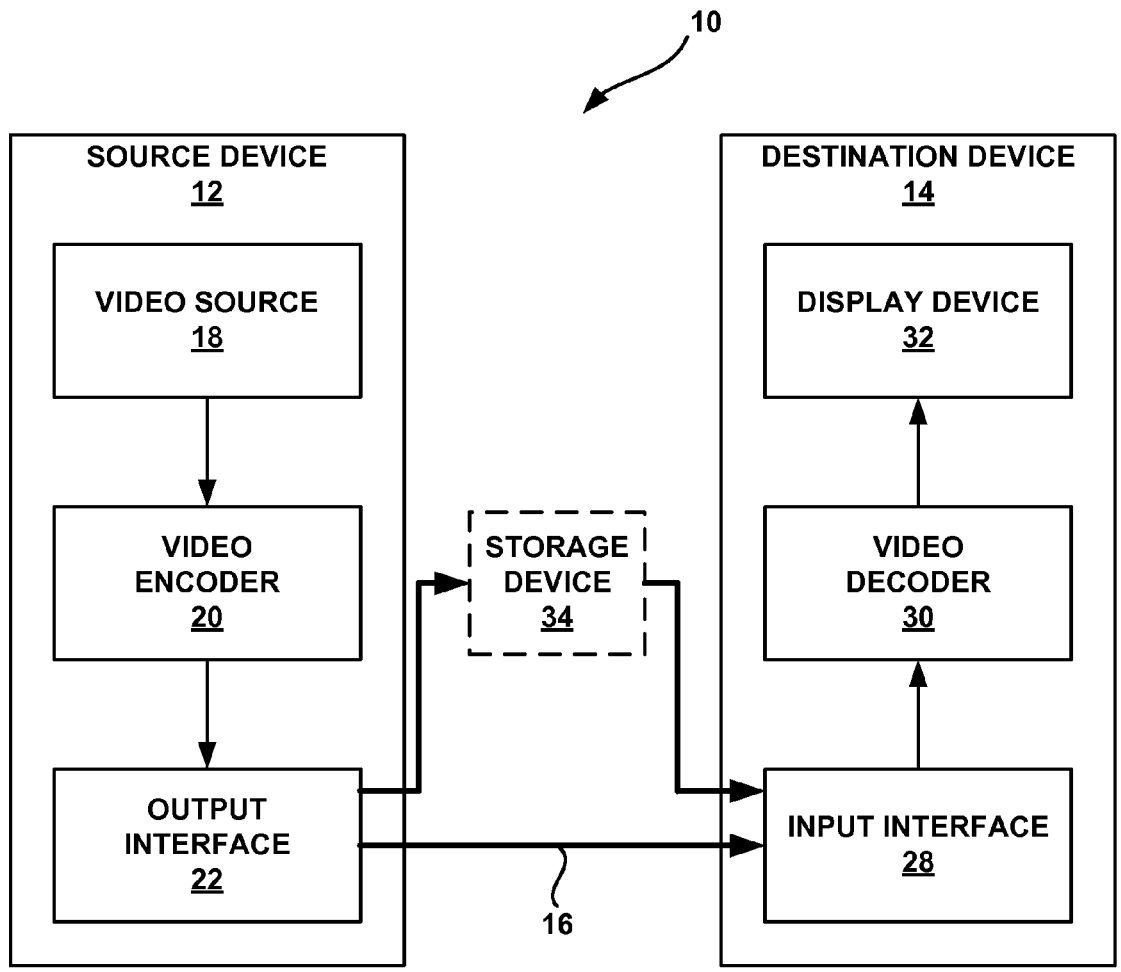
FIG. 1 is a block diagram illustrating an example video encoding and decoding system that may utilize the techniques described in this disclosure.

This disclosure describes various techniques for video coding, and more particularly to techniques for signaling timing information, e.g., to specify picture output timing and/or to define a buffering or decoding model such as a hypothetical reference decoder (HRD). In general, the term "signaling" is used in this disclosure to refer to signaling that takes place within a coded bitstream. An encoder may generate syntax elements to signal information in a bitstream as part of a video encoding process. A decoding device or other video processing device, may receive a coded bitstream, and interpret syntax elements in the coded bitstream as part of a video decoding process or other video processing. For example, to indicate the output timing for switching from a given picture to the next picture in a coded video sequence according to the output ordering, the timing information for the coded video sequence may in some cases signal a number of clock ticks that correspond to a difference of picture order count (POC) values equal to one. A difference of POC values equal to one may represent the difference between a POC value for a given picture and the POC value for the next picture according to the output ordering, e.g. the POC value for the $2^{nd}$ picture and the POC value for the $3^{rd}$ picture according to the output ordering. The video timing information may also include a condition that specifies whether the video timing information signals the number of clock ticks that correspond to a difference of picture order count values equal to one. In other words, only if the condition holds does the video timing information signal the number of clock ticks that correspond to a difference of picture order count values equal to one. In some cases, the condition does not hold and the video timing information does not signal the number of clock ticks that correspond to a difference of picture order count values equal to one. The number of clock ticks may depend upon the time scale (corresponding, e.g., to an oscillator frequency—such as 27 MHz—that defines a time coordinate system for the signaled information) and the number of time units of a clock operating at the time scale that corresponds to one increment of a clock tick counter, which is referred to as a "clock tick."

In some examples, the techniques of this disclosure may include directly signaling, in the VPS syntax structure or in the VUI part of the SPS syntax structure for a coded video sequence, all syntax elements that define the condition for signaling a number of clock ticks corresponding to a difference of POC values equal to 1. That is, in some cases, the condition may have one or more dependencies upon additional information (i.e., the syntax elements) signaled in the VPS syntax structure or in the VUI part of the SPS syntax structure. These syntax elements may include a timing information present flag, as described below.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264

(also known as ISO/IEC MPEG-4 AVC), including its Scalable Video Coding (SVC) and Multiview Video Coding (MVC) extensions.

In addition, there is a new video coding standard, namely High Efficiency Video Coding (HEVC), being developed by the Joint Collaboration Team on Video Coding (JCT-VC) of ITU-T Video Coding Experts Group (VCEG) and ISO/IEC Motion Picture Experts Group (MPEG). The latest Working Draft (WD) of HEVC, and referred to as HEVC WD9 or simply WD9 hereinafter, is Bross et al., "Proposed editorial improvements for High Efficiency Video Coding (HEVC) text specification draft 9 (SoDIS)," Joint Collaborative Team on Video Coding (JCT-VC) of ITU-T SG 16 WP 3 and ISO/IEC JTC 1/SC 29/WG 11, 12th Meeting: Geneva, CH, 14-23 Jan. 2013, available from http://phenix.int-evry.fr/jct/doc_end_user/documents/12_Geneva/wg11/JCTVC-L0030-v1.zip, as of Jan. 7, 2013.

A recent draft of the HEVC standard, referred to as "HEVC Working Draft 10" or "WD10," is described in document JCTVC-L1003v34, Bross et al., "High efficiency video coding (HEVC) text specification draft 10 (for FDIS & Last Call)," Joint Collaborative Team on Video Coding (JCT-VC) of ITU-T SG16 WP3 and ISO/IEC JTC1/SC29/WG11, 12th Meeting: Geneva, CH, 14-23 Jan., 2013, which is downloadable from: http://phenix.int-evry.fr/jct/doc_end_user/documents/12_Geneva/wg11/JCTVC-L1003-v34.zip.

Another draft of the HEVC standard, referred to herein as "WD10 revisions," is described in Bross et al., "Editors' proposed corrections to HEVC version 1," Joint Collaborative Team on Video Coding (JCT-VC) of ITU-T SG16 WP3 and ISO/IEC JTC1/SC29/WG11, 13th Meeting, Incheon, KR, April 2013, which as of Jun. 7, 2013, is available from: http://phenix.int-evry.fr/jct/doc_end_user/documents/13_Incheon/wg11/JCTVC-M0432-v3.zip HEVC standardization efforts are based on a model of a video coding device referred to as the HEVC Test Model (HM). The HM presumes improvements in the capabilities of current video coding devices with respect to video coding devices available during the development of other previous video coding standards, e.g., ITU-T H.264/AVC. For example, whereas H.264 provides nine intra-prediction encoding modes, HEVC provides as many as thirty-five intra-prediction encoding modes. The entire contents of HEVC WD9 and HEVC WD 10 are incorporated herein by reference.

Video coding standards typically include a specification of a video buffering model. In AVC and HEVC, the buffering model is referred to as the hypothetical reference decoder (HRD), which includes a buffering model of both the coded picture buffer (CPB) and the decoded picture buffer (DPB). As defined in HEVC WD9, an HRD is a hypothetical decoder model that specifies constrains on the variability of Network Abstraction Layer (NAL) unit streams or conforming byte streams that an encoding process may produce. The CPB and DPB behaviors are mathematically specified. The HRD directly imposes constraints on different timing, buffer sizes and bit rates, and indirectly imposes constraints on bitstream characteristics and statistics. A complete set of HRD parameters include five basic parameters: initial CPB removal delay, CPB size, bit rate, initial DPB output delay, and DPB size.

In AVC and HEVC, bitstream conformance and decoder conformance are specified as parts of the HRD specification. Although "Hypothetical Reference Decoder" includes the term "decoder," HRD is typically needed at the encoder side to guarantee bitstream conformance and is typically not needed at the decoder side. Two types of bitstream or HRD conformance, namely Type I and Type II, are specified. Also, two types of decoder conformance, output timing decoder conformance and output order decoder conformance are specified.

In HEVC WD9, HRD operations require parameters signaled in the hrd_parameters( ) syntax structures, buffering period supplemental enhancement information (SEI) messages, picture timing SEI messages and sometimes also in decoding unit information SEI messages. The hrd_parameters( ) syntax structures may be signaled in the video parameter set (VPS), the sequence parameter set (SPS), or any combination thereof.

In HEVC WD9, the hrd_parameters( ) syntax structure includes syntax elements for signaling of video timing information, including time scale and the number of units in a clock tick. The video usability information (VUI) part of the SPS includes a flag indicating whether the picture order count (POC) value for each picture in the coded video sequence that is not the first picture in the coded video sequence, in decoding order, is proportional to the output time of the picture relative to the output time of the first picture in the coded video sequence; if yes, then the number of clock ticks corresponding to a difference of picture order count values equal to 1.

The related syntax and semantics in HEVC WD9 are as follows. Table 1 shows an example video parameter set raw byte sequence payload (RBSP) syntax structure according to WD9.

TABLE 1

Example video parameter set RBSP syntax structure

|  | Descriptor |
| --- | --- |
| video_parameter_set_rbsp( ) { | |
| ... | |
|   vps_num_hrd_parameters | ue(v) |
|   for( i = 0; i < vps_num_hrd_parameters; i++ ) { | |
|     hrd_op_set_idx[ i ] | ue(v) |
|     if( i > 0 ) | |
|       cprms_present_flag[ i ] | u(1) |
|     hrd_parameters( cprms_present_flag[ i ], vps_max_sub_layers_minus1 ) | |
|   } | |
| ... | |
| } | |

In Table 1 above, the syntax element vps_num_hrd_parameters specifies the number of hrd_parameters( ) syntax structures present in the video parameter set Raw Byte Sequence Payload (RBSP). In bitstreams conforming to this version of this Specification, the value of vps_num_hrd_parameters shall be less than or equal to 1. Although the value of vps_num_hrd_parameters is required to be less than or equal to 1 in HEVC WD9, decoders shall allow other values of vps_num_hrd_parameters in the range of 0 to 1024, inclusive to appear in the syntax.

The syntax element hrd_op_set_idx[i] specifies the index, in the list of operation point sets specified by the video parameter set, of the operation point set to which the i-th hrd_parameters( ) syntax structure in the video parameter set (VPS) applies. In bitstreams conforming to this version of this Specification, the value of hrd_op_set_idx[i] shall be equal to 0. Although the value of hrd_op_set_idx[i] is required to be less than or equal to 1 in HEVC WD9, decoders shall allow other values of hrd_op_set_idx[i] in the range of 0 to 1023 to appear in the syntax.

The syntax element cprms_present_flag[i] equal to 1 specifies that the HRD parameters that are common for all sub-layers are present in the i-th hrd_parameters( ) syntax structure in the video parameter set. cprms_present_flag[i] equal to 0 specifies that the HRD parameters that are common for all sub-layers are not present in the i-th hrd_parameters( ) syntax structure in the video parameter set and are derived to be the same as the (i−1)-th hrd_parameters( ) syntax structure in the video parameter set. cprms_present_flag[0] is inferred to be equal to 1.

Table 2 below shows a VUI parameters syntax structure according to WD9.

TABLE 2

| VUI parameters syntax structure | |
|---|---|
| | Descriptor |
| vui_parameters( ) { | |
| ... | |
| hrd_parameters_present_flag | u(1) |
| if( hrd_parameters_present_flag ) | |
| hrd_parameters( 1, sps_max_sub_layers_minus1 ) | |
| poc_proportional_to_timing_flag | u(1) |
| if(poc_proportional_to_timing_flag && | |
| timing_info_present_flag ) | |
| num_ticks_poc_diff_one_minus1 | ue(v) |
| ... | |
| } | |

In Table 2 above, the syntax element hrd_parameters_present_flag equal to 1 specifies that the syntax structure hrd_parameters( ) is present in the vui_parameters( ) syntax structure. The hrd_parameters_present_flag equal to 0 specifies that the syntax structure hrd_parameters( ) is not present in the vui_parameters( ) syntax structure.

The syntax element poc_proportional_to_timing_flag equal to 1 indicates that the picture order count value for each picture in the coded video sequence that is not the first picture in the coded video sequence, in decoding order, is proportional to the output time of the picture relative to the output time of the first picture in the coded video sequence. The poc_proportional_to_timing_flag equal to 0 indicates that the picture order count value for each picture in the coded video sequence that is not the first picture in the coded video sequence, in decoding order, may or may not be proportional to the output time of the picture relative to the output time of the first picture in the coded video sequence.

The syntax element num_ticks_poc_diff_one_minus1 plus 1 specifies the number of clock ticks corresponding to a difference of picture order count values equal to 1.

Table 3 below shows an example HRD parameters syntax structure according to WD9.

TABLE 3

| Example HRD parameters syntax structure | |
|---|---|
| | Descriptor |
| hrd_parameters( commonInfPresentFlag, | |
| maxNumSubLayersMinus1 ) { | |
| if( commonInfPresentFlag ) { | |
| timing_info_present_flag | u(1) |
| if( timing_info_present_flag ) { | |
| num_units_in_tick | u(32) |
| time_scale | u(32) |
| } | |
| ... | |
| } | |

In Table 3 above, the syntax element timing_info_present_flag equal to 1 specifies that num_units_in_tick and time_scale are present in the hrd_parameters( ) syntax structure. If the timing_info_present_flag is equal to 0, the num_units_in_tick and time_scale are not present in the hrd_parameters( ) syntax structure. If not present, the value of timing_info_present_flag is inferred to be 0.

The syntax element num_units_in_tick is the number of time units of a clock operating at the frequency time_scale Hz that corresponds to one increment (called a clock tick) of a clock tick counter. The value for syntax element num_units_in_tick shall be greater than 0. A clock tick is the minimum interval of time that can be represented in the coded data when sub_pic_cpb_params_present_flag is equal to 0. For example, when the picture rate of a video signal is 25 Hz, time_scale may be equal to 27,000,000 and num_units_in_tick may be equal to 1,080,000.

The syntax element time_scale is the number of time units that pass in one second. For example, a time coordinate system that measures time using a 27 MHz clock has a time_scale of 27,000,000. The value for syntax element time_scale shall be greater than 0.

The timing signaling as specified in HEVC WD9 and as described above may exhibit a number of problems. First, the condition for signaling of the syntax element num_ticks_poc_diff_one_minus1 is "if (poc_proportional_to_timing_flag && timing_info_present_flag)". This condition includes dependencies upon two signaled syntax elements: poc_proportional_to_timing_flag and timing_info_present_flag. However, it is not clear from the HEVC WD9 specification whether the timing_info_present_flag for the condition references the syntax element timing_info_present_flag of an hrd_parameters( ) syntax structure (if present) in the VUI part of the SPS or references the syntax element timing_info_present_flag of an hrd_parameters( ) syntax structure in the VPS.

In addition, multiple layers or multiple possible bitstream subsets of a scalable video bitstream may share the common values of time scale and the number of units in a clock tick, which are specified in HEVC WD9 in the syntax elements time_scale and num_units_in_tick of an hrd_parameters( ) syntax structure, which may be repeatedly signaled in the VUI part of the SPS and in the VPS, for instance. Such replication, if present in the bitstream, may result in bit wastage.

Further, picture order count (POC) values are typically proportional to output times for all layers of a scalable video bitstream if the POC values are proportional to output times for any of the layers of a scalable video bitstream. However, the HEVC WD9 specification does not provide for signaling, in the scalable video bitstream, an indication that POC values are proportional to output times for all layers or all possible bitstream subsets of the scalable video bitstream. Reference to a "layer" of a scalable video bitstream may refer to a scalable layer, a texture view, and/or a depth view, for instance. In addition, although HEVC WD9 specifies that the flag poc_proportional_to_timing_flag is always signaled in the VUI syntax structure of the SPS, the flag poc_proportional_to_timing_flag has no utility if the syntax elements time_scale and num_units_in_tick are not also signaled in the bitstream.

The techniques of this disclosure may solve one or more of the above problems, as well as provide other improvements, to enable efficient signaling of parameters for HRD operations. Various examples of the techniques are described herein with reference to HEVC WD9 and potential improvements thereto. The solutions apply to any video coding standards, including AVC and HEVC, for example, that include a specification for a video buffering model, though for purposes of illustration the description is specific to the HRD parameters signaling defined in HEVC WD9 and modified in accordance with the techniques of this disclosure.

FIG. 1 is a block diagram illustrating an example video encoding and decoding system 10 that may utilize the techniques described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 32. Similarly, encoded data may be accessed from storage device 32 by input interface. Storage device 32 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 32 may correspond to a file server or another intermediate storage device that may hold the encoded video generated by source device 12. Destination device 14 may access stored video data from storage device 32 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 32 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 32 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 32, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. A treeblock has a similar purpose as a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU includes a coding node and prediction units (PUs) and transform units (TUs) associated with the coding node. A size of the CU generally corresponds to a size of the coding node and must typically be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

In general, a TU is used for the transform and quantization processes. A given CU having one or more PUs may also include one or more transform units (TUs). Following prediction, video encoder 20 may calculate residual values from the video block identified by the coding node in accordance with the PU. The coding node is then updated to reference the residual values rather than the original video block. The residual values comprise pixel difference values that may be transformed into transform coefficients, quantized, and scanned using the transforms and other transform information specified in the TUs to produce serialized transform coefficients for entropy coding. The coding node may once again be updated to refer to these serialized transform coefficients. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data to which the transforms specified by TUs of the CU are applied. The residual data may correspond to pixel differences between pixels of the unencoded picture and prediction values corresponding to the CUs. Video encoder 20 may form the residual data for the CU, and then transform the residual data to produce transform coefficients.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Source device 12 may generate an encoded bitstream to include syntax elements that conform to a syntax structure in accordance with techniques described in this disclosure. In some examples, video encoder 20 may generate the encoded bitstream to directly signal, in the video parameter set (VPS) syntax structure or in the video usability information (VUI) part of the sequence parameter set (SPS) syntax structure for a coded video sequence, all variables that define the condition for signaling a number of clock ticks corresponding to a difference of picture order count (POC) values equal to 1. In other words, rather than signaling the syntax elements for the condition for signaling a number of clock ticks corresponding to a difference of picture order count (POC) values equal to 1 in another syntax structure (such as the HRD parameters syntax structure) that is incorporated into a VPS syntax structure or VUI part of the SPS syntax structure, the video encoder 20 generates the encoded bitstream to signal the syntax elements that define the condition in the VPS and/or VUI syntax structure without reference to another syntax structure potentially incorporated within either/both of the VPS and VUI syntax structure. The syntax elements may include the timing_info_present_flag syntax element that is specified in HEVC WD9 as a syntax element of the HRD parameters syntax structure. As a result, the techniques may reduce and potentially eliminate ambiguity within the HEVC WD9 specification by clearly specifying in the syntax the source of syntax elements that define the condition.

The video encoder 20 may test the encoded bitstream for conformance to requirements specified as one or more bitstream conformance tests defined in a video coding specification, such as HEVC WD9 or a successor specification such as HEVC WD10. The video encoder 20 may include or otherwise use a hypothetical reference decoder to test the encoded bitstream for conformance. According to techniques described herein, the video encoder 20 may test the encoded bitstream for conformance by decoding the encoded bitstream to determine, from the VPS syntax structure or in the VUI part of the SPS syntax structure for a coded video sequence, the syntax elements that define the condition for signaling the number of clock ticks corresponding to a difference of POC values equal to 1. If the condition holds according to the syntax element values, video encoder 20 may determine the number of clock ticks corresponding to a difference of POC values equal to 1 and use the determined number of clock ticks as input for, e.g., determining CPB underflow or overflow during decoding of encoded pictures included in the encoded bitstream.

In some instances, at the destination device 14, a video decoder 30 under test (or VUT) may in some cases receive a representation of the encoded bitstream generated by video encoder 20 to directly signal, in the VPS syntax structure or in the VUI part of the SPS syntax structure for a coded video sequence, all syntax elements that define the condition for signaling a number of clock ticks corresponding to a difference of picture order count (POC) values equal to 1. Video decoder 30 may decode the encoded bitstream to determine, from the VPS syntax structure or in the VUI part of the SPS syntax structure for a coded video sequence, the syntax elements that define the condition for signaling the number of clock ticks corresponding to a difference of POC values equal to 1. If the condition holds according to the syntax element values, video decoder 30 may determine the number of clock ticks corresponding to a difference of POC values equal to 1 and use the determined number of clock ticks as input for, e.g., determining CPB underflow or overflow during decoding of encoded pictures included in the encoded bitstream.

In some examples, the video encoder 20 may generate the encoded bitstream to signal the time scale and the number of units in a clock tick at most once in each of the VPS and VUI syntax structures for a given coded video sequence. That is, in a given VPS syntax structure for the encoded bitstream, video encoder 20 may signal the time scale and number of units in a clock tick syntax elements at most once. Likewise, in a given VUI syntax structure (e.g., the VUI part of an SPS syntax structure) for the encoded bitstream, video encoder 20 may signal the time scale and number of units in a clock tick syntax elements at most once. As a result, the video encoder 20 operating according to techniques described herein may reduce a number of instances of the time scale syntax element (time_scale per WD9) and the number of units in a clock tick (num_units_in_tick per WD9) syntax element in the encoded bitstream. In addition, the video encoder 20 may in some instances generate the encoded bitstream to directly signal the time scale and the number of units in a clock tick in each of the VPS and VUI syntax structures for a given coded video sequence, rather than in an HRD parameters syntax structure incorporated within a VPS and/or VUI syntax structure.

According to techniques described herein, the video encoder 20 may test an encoded bitstream, generated by video encoder 20 to signal the time scale and the number of units in a clock tick at most once in each of the VPS and VUI syntax structures for a given coded video sequence, for conformance by decoding the encoded bitstream to determine the time scale and the number of units in a clock tick from a VPS syntax structure of the encoded bitstream that encodes the time scale and the number of units in a clock tick syntax elements at most once in the VPS syntax structure. In some instances, the video encoder 20 may test the encoded bitstream for conformance by decoding the encoded bitstream to determine the time scale and the number of units in a clock tick from a VUI syntax structure of the encoded bitstream that encodes the time scale and the number of units in a clock tick syntax elements at most once in the VUI syntax structure. The time scale and number of units in a clock tick may be signaled other than in an HRD parameters syntax structure incorporated within the VPS and/or VUI syntax structure. Video encoder 20 may use the determined time scale and the determined number of units in a clock tick as input for, e.g., determining CPB underflow or overflow during decoding of encoded pictures included in the encoded bitstream.

In some instances, at the destination device 14, a video decoder 30 under test may in some cases receive a representation of the encoded bitstream generated by video encoder 20 to signal the time scale and the number of units in a clock tick at most once in each of the VPS and VUI syntax structures for a given coded video sequence. The video decoder 30 may decode the encoded bitstream to determine the time scale and the number of units in a clock tick from a VPS syntax structure of the encoded bitstream that encodes the time scale and the number of units in a clock tick syntax elements at most once in the VPS syntax structure. In some instances, the video decoder 30 may test the encoded bitstream for conformance by decoding the encoded bitstream to determine the time scale and the number of units in a clock tick from a VUI syntax structure of the encoded bitstream that encodes the time scale and the number of units in a clock tick syntax elements at most once in the VUI syntax structure. The time scale and number of units in a clock tick may be signaled other than in an HRD parameters syntax structure incorporated within the VPS and/or VUI syntax structure. Video decoder 30 may use the determined time scale and the determined number of units in a clock tick as input for, e.g., determining CPB underflow or overflow during decoding of encoded pictures included in the encoded bitstream.

In some examples, the video encoder 20 may generate the encoded bitstream to signal, in a VPS syntax structure for one or more coded video sequences, a flag indicating whether the POC value for each picture in a coded video sequence that is not the first picture in the coded video sequence, in decoding order, is proportional to the output time of the picture relative to the output time of the first picture in the coded video sequence. This indication flag may alternatively be referred to as the POC proportional to timing indication flag. As a result, the video encoder 20 may reduce a number of instances of the indication in the timing information signaled for multiple layers of a coded video sequence and/or for a scalable video bitstream having multiple layers. In some instances, the video encoder 20 may include this flag in the VPS syntax structure only if the time scale and number of units in a clock tick syntax elements are also included. The video encoder 20 may in this way avoid signaling this particular timing information (i.e., whether the POC value for each picture in a coded video sequence that is not the first picture in the coded video sequence, in decoding order, is proportional to the output time of the picture relative to the output time of the first picture in the coded video sequence) if the clock tick information needed for using the POC proportional to timing indication is not also present.

According to techniques described herein, the video encoder 20 may test, for conformance, an encoded bitstream generated by video encoder 20 to signal, in a VPS syntax structure for one or more coded video sequences, the POC proportional to timing indication flag. The video encoder 20 may test the encoded bitstream for conformance by decoding the encoded bitstream to determine a value for the flag. The video encoder 20 may additionally, or alternatively, test an encoded bitstream, generated by video encoder 20 to signal the flag in the VPS syntax structure only if the time scale and number of units in a clock tick syntax elements are also included. The video encoder 20 may use the determined value of the POC proportional to timing indication flag and the time scale and number of units in a clock tick syntax elements as input for, e.g., determining CPB underflow or overflow during decoding of encoded pictures included in the encoded bitstream.

In some instances, at the destination device 14, a video decoder 30 under test may in some cases receive a representation of the encoded bitstream generated by video encoder 20 to signal, in a VPS syntax structure for one or more coded video sequences, a POC proportional to timing indication flag. The video decoder 30 may test the encoded bitstream for conformance by decoding the encoded bitstream to determine a value for the flag. The video decoder 30 may additionally, or alternatively, test an encoded bitstream, generated by video decoder 30 to signal the flag in the VPS syntax structure only if the time scale and number of units in a clock tick syntax elements are also included. The video decoder 30 may use the determined value of the POC proportional to timing indication flag and the time scale and number of units in a clock tick syntax elements as input for, e.g., determining CPB underflow or overflow during decoding of encoded pictures included in the encoded bitstream.

Figure 2:
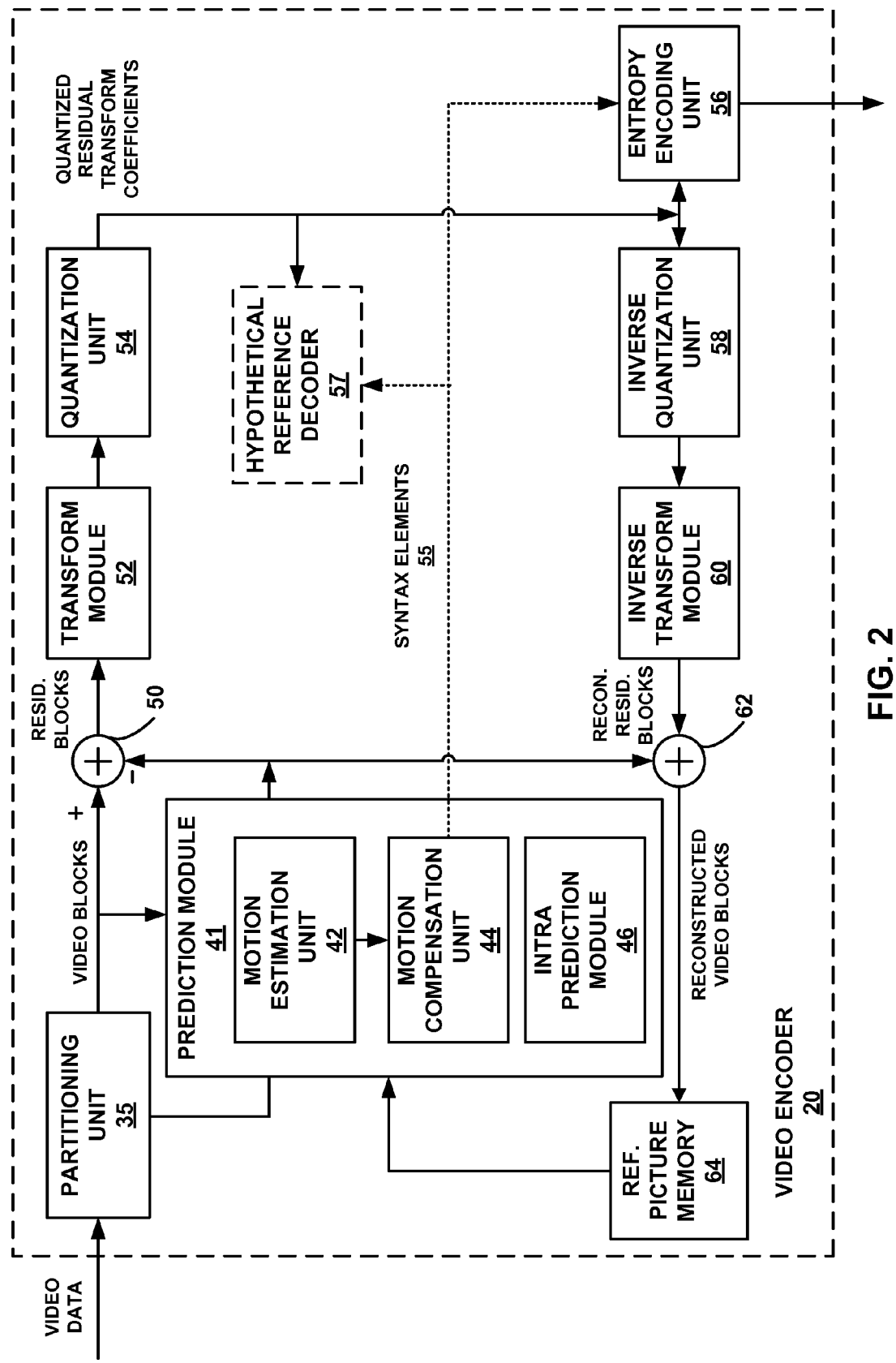
FIG. 2 is a block diagram illustrating an example video encoder that may implement the techniques described in this disclosure.

FIG. 2 is a block diagram illustrating an example video encoder 20 that may implement the techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 2, video encoder 20 includes a partitioning unit 35, prediction module 41, reference picture memory 64, summer 50, transform module 52, quantization unit 54, and entropy encoding unit 56. Prediction module 41 includes motion estimation unit 42, motion compensation unit 44, and intra prediction module 46. For video block reconstruction, video encoder 20 also includes inverse quantization unit 58, inverse transform module 60, and summer 62. A deblocking filter (not shown in FIG. 2) may also be included to filter block boundaries to remove blockiness artifacts from reconstructed video. If desired, the deblocking filter would typically filter the output of summer 62. Additional loop filters (in loop or post loop) may also be used in addition to the deblocking filter.

As shown in FIG. 2, video encoder 20 receives video data, and partitioning unit 35 partitions the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction module 41 may select one of a plurality of possible coding modes, such as one of a plurality of intra coding modes or one of a plurality of inter coding modes, for the current video block based on error results (e.g., coding rate and the level of distortion). Prediction module 41 may provide the resulting intra- or inter-coded block to summer 50 to generate residual block data and to summer 62 to reconstruct the encoded block for use as a reference picture.

Intra prediction module 46 within prediction module 41 may perform intra-predictive coding of the current video block relative to one or more neighboring blocks in the same frame or slice as the current block to be coded to provide spatial compression. Motion estimation unit 42 and motion compensation unit 44 within prediction module 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements 55 associated with the video blocks and the video slice for use by video decoder 30 in decoding the video blocks of the video slice.

Motion compensation unit 44 may generate syntax elements 55 that conform to a syntax structure in accordance with techniques described in this disclosure. In some examples, video encoder 20 may generate syntax elements 55 to directly signal, in the video parameter set (VPS) syntax structure or in the video usability information (VUI) part of the sequence parameter set (SPS) syntax structure associated with the video blocks, all syntax elements that define the condition for signaling a number of clock ticks corresponding to a difference of picture order count (POC) values equal to 1. In other words, rather than signaling the syntax elements for the condition for signaling a number of clock ticks corresponding to a difference of picture order count (POC) values equal to 1 in another syntax structure (such as the HRD parameters syntax structure) that is incorporated into a VPS syntax structure or VUI part of the SPS syntax structure, the motion compensation unit 44 generates the encoded bitstream to signal the syntax elements for the syntax elements that define the condition in the VPS and/or VUI syntax structure without reference to another syntax structure potentially incorporated within either/both of the VPS and VUI syntax structure.

In some examples, the motion compensation unit 44 may generate the syntax elements 55 to signal the time scale and the number of units in a clock tick at most once in each of the VPS and VUI syntax structures for a given coded video sequence. That is, in a given VPS syntax structure for the encoded bitstream, the motion compensation unit 44 may generate the syntax elements 55 to signal the time scale and number of units in a clock tick syntax elements at most once. Likewise, in a given VUI syntax structure (e.g., the VUI part of an SPS syntax structure) for the encoded bitstream, the motion compensation unit 44 may generate the syntax elements 55 signal the time scale and number of units in a clock tick syntax elements at most once. In addition, the motion compensation unit 44 may in some instances generate the syntax elements 55 to directly signal the time scale and the number of units in a clock tick in each of the VPS and VUI syntax structures for a given coded video sequence, rather than in an HRD parameters syntax structure incorporated within a VPS and/or VUI syntax structure.

In some examples, the motion compensation unit 44 may generate the syntax elements 55 to signal, in a VPS syntax structure for one or more coded video sequences, a flag indicating whether the POC value for each picture in a coded video sequence that is not the first picture in the coded video sequence, in decoding order, is proportional to the output time of the picture relative to the output time of the first picture in the coded video sequence. This indication flag may alternatively be referred to as the POC proportional to timing indication flag. As a result, the motion compensation unit 44 may reduce a number of instances of the indication in the timing information signaled for multiple layers of a coded video sequence and/or for a scalable video bitstream having multiple layers. In some instances, the motion compensation unit 44 may include this flag in the VPS syntax structure only if the time scale and number of units in a clock tick syntax elements are also included. The motion compensation unit 44 may in this way avoid signaling this particular timing information (i.e., whether the POC value for each picture in a coded video sequence that is not the first picture in the coded video sequence, in decoding order, is proportional to the output time of the picture relative to the output time of the first picture in the coded video sequence) if the clock tick information needed for using the POC proportional to timing indication is not also present.

Example changes to the HEVC WD9 text to effectuate the above techniques for generating syntax elements 55 are as follows (other parts not mentioned may unmodified vis-à-vis HEVC WD9):

The following is an example of a video parameter set RBSP syntax structure modified to solve one or more of the above problems (the underlined syntax is an addition to the video parameters set RBSP syntax structure of HEVC WD9; other syntax may be unchanged relative to HEVC WD9):

TABLE 4

Example video parameter set RBSP syntax structure

|  | Descriptor |
|---|---|
| video_parameter_set_rbsp( ) { | |
| ... | |
|   vps timing info present flag | u(1) |
|   if( vps_timing_info_present_flag ) { | |
|     vps num units in tick | u(32) |
|     vps time scale | u(32) |
|     vps poc proportional to timing flag | u(1) |
|     if( vps_poc_proportional_to_timing_flag ) | |
|       vps num ticks poc diff one minus1 | ue(v) |
|   } | |
|   vps_num_hrd_parameters | ue(v) |
|   for( i = 0; i < vps_num_hrd_parameters; i++ ) { | |
|     cprms_present_flag[ i ] | u(1) |
|     hrd_parameters( cprms_present_flag[ i ], vps_max_sub_layers_minus1 ) | |
|   } | |
| ... | |
| } | |

Table 4 defines newly-added syntax elements according to the following video parameter set (VPS) RBSP semantics:

vps_timing_info_present_flag equal to 1 specifies that vps_num_units_in_tick, vps_time_scale, and vps_poc_proportional_to_timing_flag are present in the video parameter set. vps_timing_info_present_flag equal to 0 specifies that vps_num_units_in_tick, vps_time_scale, and vps_poc_proportional_to_timing_flag are not present in the video parameter set.

vps_num_units_in_tick is the number of time units of a clock operating at the frequency vps_time_scale Hz that corresponds to one increment (called a clock tick) of a clock tick counter. The value of vps_num_units_in_tick shall be greater than 0. A clock tick, in units of seconds, is equal to the quotient of vps_num_units_in_tick divided by vps_time_scale. For example, when the picture rate of a video signal is 25 Hz, vps_time_scale may be equal to 27,000,000 and vps_num_units_in_tick may be equal to 1,080,000, and consequently a clock tick may be 0.04 seconds.

vps_time_scale is the number of time units that pass in one second. For example, a time coordinate system that measures time using a 27 MHz clock has a vps_time_scale of 27,000,000. The value of vps_time_scale shall be greater than 0.

vps_poc_proportional_to_timing_flag equal to 1 indicates that the picture order count value for each picture in the coded video sequence that is not the first picture in the coded video sequence, in decoding order, is proportional to the output time of the picture relative to the output time of the first picture in the coded video sequence. vps_poc_proportional_to_timing_flag equal to 0 indicates that the picture order count value for each picture in the coded video sequence that is not the first picture in the coded video sequence, in decoding order, may or may not be proportional to the output time of the picture relative to the output time of the first picture in the coded video sequence.

vps_num_ticks_poc_diff_one_minus1 plus 1 specifies the number of clock ticks corresponding to a difference of picture order count values equal to 1. The value of vps_num_ticks_poc_diff_one_minus1 shall be in the range of 0 to $2^{32}-1$, inclusive.

The following is an example of a VUI parameters syntax structure modified to solve one or more of the above problems (the underlined syntax is an addition to the VUI parameters syntax structure of HEVC WD9; the italicized syntax is removed from the VUI parameters syntax structure of HEVC WD9; other portions of the syntax table are unchanged relative to HEVC WD9):

TABLE 5

Example modified VUI parameters syntax structure

|  | Descriptor |
|---|---|
| vui_parameters( ) { | |
| ... | |
|   sps timing info present flag | u(1) |
|   if( sps_timing_info_present_flag ) { | |
|     sps num units in tick | u(32) |
|     sps_time_scale | u(32) |
|     sps_poc_proportional_to_timing_flag | u(1) |
|     if( sps_poc_proportional_to_timing_flag ) | |
|       sps num ticks poc diff one minus1 | ue(v) |
|   } | |
|   hrd_parameters_present_flag | u(1) |
|   if( hrd_parameters_present_flag ) | |
|     hrd_parameters( 1, sps_max_sub_layers_minus1 ) | |
|   poc_proportional_to_timing_flag | u(1) |
|   if( poc_proportional_to_timing_flag && timing_info_present_flag) | |
|     num_ticks_poc_diff_one_minus1 | ue(v) |
|   ... | |
| } | |

Table 5 defines newly-added syntax elements according to the following VUI parameters semantics (semantics for the removed syntax elements are likewise removed):

sps_timing_info_present_flag equal to 1 specifies that sps_num_units_in_tick, sps_time_scale, and sps_poc_proportional_to_timing_flag are present in the vui_parameters( ) syntax structure. sps_timing_info_present_flag equal to 0 specifies that sps_num_units_in_tick, sps_time_scale, and sps_poc_proportional_to_timing_flag are not present in the vui_parameters( ) syntax structure.

sps_num_units_in_tick is the number of time units of a clock operating at the frequency sps_time_scale Hz that corresponds to one increment (called a clock tick) of a clock tick counter. sps_num_units_in_tick shall be greater than 0. A clock tick, in units of seconds, is equal to the quotient of sps_num_units_in_tick divided by sps_time_scale. For example, when the picture rate of a video signal is 25 Hz, sps_time_scale may be equal to 27,000,000 and sps_num_units_in_tick may be equal to 1,080,000, and consequently a clock tick may be equal to 0.04 seconds (see Equation (1)). When vps_num_units_in_tick is present in the video parameter set referred to by the sequence parameter set, sps_num_units_in_tick, when present, shall be equal to vps_num_units_in_tick.

The formula for deriving the variable ClockTick (also referred to herein as a "clock tick") is modified to be as follows:

$$ClockTick = \frac{sps\_num\_units\_in\_tick}{sps\_time\_scale} \quad \text{Equation (1)}$$

sps_time_scale is the number of time units that pass in one second. For example, a time coordinate system that measures time using a 27 MHz clock has a sps_time_scale of 27,000,000. The value of sps_time_scale shall be greater than 0. When vps_time_scale is present in the video parameter set referred to by the sequence parameter set, sps_time_scale, when present, shall be equal to vps_time_scale.

sps_poc_proportional_to_timing_flag equal to 1 indicates that the picture order count value for each picture in the coded video sequence that is not the first picture in the coded video sequence, in decoding order, is proportional to the output time of the picture relative to the output time of the first picture in the coded video sequence. The sps_poc_proportional_to_timing_flag equal to 0 indicates that the picture order count value for each picture in the coded video sequence that is not the first picture in the coded video sequence, in decoding order, may or may not be proportional to the output time of the picture relative to the output time of the first picture in the coded video sequence. When vps_poc_proportional_to_timing_flag is present in the video parameter set referred to by the sequence parameter set, sps_poc_proportional_to_timing_flag, when present, shall be equal to vps_poc_proportional_to_timing_flag.

sps_num_ticks_poc_diff_one_minus1 plus 1 specifies the number of clock ticks corresponding to a difference of picture order count values equal to 1. The value of sps_num_ticks_poc_diff_one_minus1 shall be in the range of 0 to 2^32−1, inclusive. When vps_num_ticks_poc_diff_one_minus1 is present in the video parameter set referred to by the sequence parameter set, sps_num_ticks_poc_diff_one_minus1, when present, shall be equal to sps_num_ticks_poc_diff_one_minus1.

The following is an example of an HRD parameters syntax structure modified to solve one or more of the above problems (the italicized syntax is removed from the HRD parameters syntax structure of HEVC WD9):

TABLE 6

Example modified HRD parameters syntax structure

| | Descriptor |
|---|---|
| hrd_parameters( commonInfPresentFlag, maxNumSubLayersMinus1 ) { | |
|   if( commonInfPresentFlag ) { | |
|     timing_info_present_flag | u(1) |
|     if( timing_info_present_flag ) { | |
|       num_units_in_tick | u(32) |
|       time_scale | u(32) |
|     } | |
|     ... | |
|   } | |

Semantics for syntax elements removed according to the example modified HRD parameters syntax structure of Table 6 are likewise removed.

The intra-prediction module 46 may intra-predict a current block, as an alternative to the inter-prediction performed by motion estimation unit 42 and motion compensation unit 44, as described above. In particular, intra-prediction module 46 may determine an intra-prediction mode to use to encode a current block. In some examples, intra-prediction module 46 may encode a current block using various intra-prediction modes, e.g., during separate encoding passes, and intra-prediction module 46 (or mode select unit 40, in some examples) may select an appropriate intra-prediction mode to use from the tested modes. For example, intra-prediction module 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction module 46 may calculate ratios from the distortions and rates for the various encoded blocks to determine which intra-prediction mode exhibits the best rate-distortion value for the block.

In any case, after selecting an intra-prediction mode for a block, intra-prediction module 46 may provide information indicative of the selected intra-prediction mode for the block to entropy coding unit 56. Entropy coding unit 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction module 41 generates the predictive block for the current video block via either inter-prediction or intra-prediction, video encoder 20 forms a residual video block by subtracting the predictive block from the current video block. The residual video data in the residual block may be included in one or more TUs and applied to transform module 52. Transform module 52 transforms the residual video data into residual transform coefficients using a transform, such as a discrete cosine transform (DCT) or a conceptually similar transform. Transform module 52 may convert the residual video data from a pixel domain to a transform domain, such as a frequency domain.

Transform module 52 may send the resulting transform coefficients to quantization unit 54. Quantization unit 54 quantizes the transform coefficients to further reduce bit rate.

The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform module 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in reference picture memory 64 (sometimes called a decoded picture buffer (DPB)). The reference block may be used by motion estimation unit 42 and motion compensation unit 44 as a reference block to inter-predict a block in a subsequent video frame or picture.

The video encoder 20 may optionally include a hypothetical reference decoder (HRD) 57 (illustrated as optional by use of dashed lines) to check encoded bitstreams generated by elements of video encoder 20 for conformance to the buffer model defined for the HRD 57. The HRD 57 may check Type I and/or Type II bitstreams or bitstream subsets for HRD conformance. Parameters sets needed for operation of the HRD 57 are signaled by one of two types of HRD parameter sets, NAL HRD parameters and VCL HRD parameters. As described above, the HRD parameter sets may be incorporated within the SPS syntax structure and/or the VPS syntax structure.

The HRD 57 may test the video blocks and associated syntax elements 55 for conformance to requirements specified as one or more bitstream conformance tests defined in a video coding specification, such as HEVC WD9 or a successor specification such as HEVC WD10. For example, the HRD 57 may test the encoded bitstream for conformance by processing the syntax elements 55 to determine, from the VPS syntax structure or in the VUI part of the SPS syntax structure for a coded video sequence, the syntax elements that define the condition for signaling the number of clock ticks corresponding to a difference of POC values equal to 1. If the condition holds according to the syntax element values, HRD 57 may determine the number of clock ticks corresponding to a difference of POC values equal to 1 and use the determined number of clock ticks as input for, e.g., determining CPB underflow or overflow during decoding of encoded pictures included in the encoded bitstream. Use herein of the term "processing" with regard to a syntax elements may refer to extracting, decoding and extracting, reading, parsing, and any other serviceable operation or combination of operations to obtain syntax elements in a form usable by a decoder/HRD 57.

As another example, the HRD 57 may test the encoded bitstream for conformance by decoding the encoded bitstream to determine the time scale and the number of units in a clock tick from a VPS syntax structure of syntax elements 55 that encodes the time scale and the number of units in a clock tick syntax elements at most once in the VPS syntax structure. In some instances, the HRD 57 may test the encoded bitstream for conformance by decoding the syntax elements 55 to determine the time scale and the number of units in a clock tick from a VUI syntax structure of the encoded bitstream that encodes the time scale and the number of units in a clock tick syntax elements at most once in the VUI syntax structure. The time scale and number of units in a clock tick may be signaled other than in an HRD parameters syntax structure incorporated within the VPS and/or VUI syntax structure. The HRD 57 may use the determined time scale and the determined number of units in a clock tick as input for, e.g., determining CPB underflow or overflow during decoding of encoded pictures included in the encoded bitstream.

According to techniques described herein, the HRD 57 may test the encoded bitstream for conformance by decoding, from a VPS syntax structure of the syntax elements 55 for one or more coded video sequences, the value for a POC proportional to timing indication flag. The HRD 57 may additionally, or alternatively, test an encoded bitstream for conformance by decoding the value for a POC proportional to timing indication flag in the VPS syntax structure only if the time scale and number of units in a clock tick syntax elements are also included. The HRD 57 may use the determined value of the POC proportional to timing indication flag and the time scale and number of units in a clock tick syntax elements as input for, e.g., determining CPB underflow or overflow during decoding of encoded pictures included in the encoded bitstream.

Figure 3:
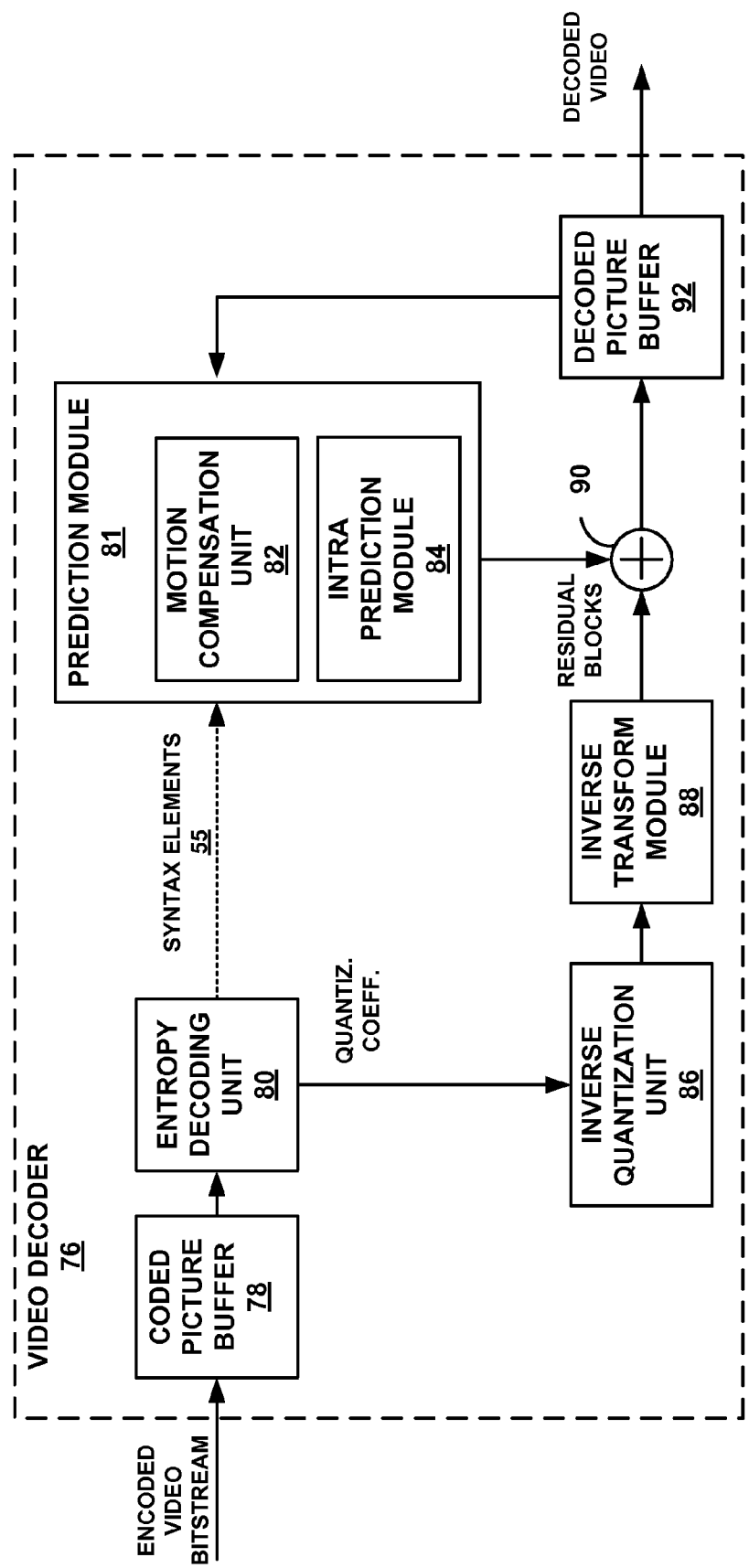
FIG. 3 is a block diagram illustrating an example video decoder that may implement the techniques described in this disclosure.

FIG. 3 is a block diagram illustrating an example video decoder 76 that may implement the techniques described in this disclosure. In the example of FIG. 3, video decoder 76 includes coded picture buffer (CPB) 78, entropy decoding unit 80, prediction module 81, inverse quantization unit 86, inverse transformation unit 88, summer 90, and decoded picture buffer (DPB) 92. Prediction module 81 includes motion compensation unit 82 and intra prediction module 84. Video decoder 76 may, in some examples, perform a decoding pass generally reciprocal to the encoding pass described with respect to video encoder 20 from FIG. 2. Video decoder 76 may represent an example instance of video decoder 30 of destination device 14 or of hypothetical reference decoder 57 of FIG. 2.

CPB 78 stores coded pictures from the encoded picture bitstream. In one example, CBP 78 is a first-in first-out buffer containing access units (AU) in decoding order. An AU is set of network abstraction layer (NAL) units that are associated with each other according to a specified classification rule, are consecutive in decoding order, and each contain exactly one coded picture. Decoding order is the order in which pictures are decoded, and may differ from the order in which pictures are displayed (i.e., the display order). The operation of the CPB may be specified by a hypothetical reference decoder (HRD).

During the decoding process, video decoder 76 receives an encoded video bitstream that represents video blocks of an encoded video slice and associated syntax elements from video encoder 20. Entropy decoding unit 80 of video decoder 76 decodes the bitstream to generate quantized coefficients, motion vectors, and other syntax elements 55. Entropy decoding unit 80 forwards the motion vectors and other syntax elements 55 to prediction module 81. Video decoder 76 may receive the syntax elements 55 at the video slice level and/or the video block level. The encoded video bitstream may include timing information signaled according to techniques described below. For example, the encoded video bitstream may include a video parameter set (VPS), a sequence parameter set (SPS), or any combination thereof having syntax structures according to techniques described herein to signal parameters for HRD operations.

When the video slice is coded as an intra-coded (I) slice, intra prediction module 84 of prediction module 81 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 82 of prediction module 81 produces predictive blocks for a video block of the current video slice based on the motion vectors and other syntax elements 55 received from entropy decoding unit 80. The predictive blocks may be produced from one of the reference pictures within one of the reference picture lists. Video decoder 76 may construct the reference frame lists, List 0 and List 1, using default construction techniques based on reference pictures stored in DPB 92.

Motion compensation unit 82 determines prediction information for a video block of the current video slice by parsing the motion vectors and other syntax elements 55, and uses the prediction information to produce the predictive blocks for the current video block being decoded. For example, motion compensation unit 82 uses some of the received syntax elements 55 to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements 55 and use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform unit 88 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and other syntax elements 55, video decoder 76 forms a decoded video block by summing the residual blocks from inverse transform unit 88 with the corresponding predictive blocks generated by motion compensation unit 82. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in DPB 92, which stores reference pictures used for subsequent motion compensation. DPB 92 also stores decoded video for later presentation on a display device, such as display device 32 of FIG. 1. Like CPB 78, in one example, the operation of DPB 92 may be specified by the Hypothetical Reference Decoder (HRD).

Encoder 20 and decoder 76, as described in this disclosure, represent examples of devices configured to perform techniques for signaling timing in a video coding process as described in this disclosure. Accordingly, operations described in this disclosure for signaling time may be performed by encoder 20, decoder 76 or both. In some instances, encoder 20 may signal timing information and decoder 76 may receive such timing information, e.g., for using in defining one or more HRD features, characteristics, parameters, or conditions.

Video decoder 76 may in some instances be a video decoder 76 under test (or VUT). The video decoder 76 may receive a representation of the encoded bitstream generated by a video encoder 20 to directly signal, in the VPS syntax structure or in the VUI part of the SPS syntax structure of syntax elements 55 for a coded video sequence, all syntax elements that define the condition for signaling a number of clock ticks corresponding to a difference of picture order count (POC) values equal to 1. Video decoder 76 may decode the encoded bitstream to determine, from the VPS syntax structure or in the VUI part of the SPS syntax structure for a coded video sequence, the syntax elements that define the condition for signaling the number of clock ticks corresponding to a difference of POC values equal to 1. If the condition holds according to the syntax element values, video decoder 76 may determine the number of clock ticks corresponding to a difference of POC values equal to 1 and use the determined number of clock ticks as input for, e.g., determining CPB 78 underflow or overflow during decoding of encoded pictures included in the encoded bitstream.

In another example, the video encoder 20 may receive a representation of the encoded bitstream generated by video encoder 20 to signal the time scale and the number of units in a clock tick at most once in each of the VPS and VUI syntax structures of syntax elements 55 for a given coded video sequence. The video decoder 76 may decode the encoded bitstream to determine the time scale and the number of units in a clock tick from a VPS syntax structure of the encoded bitstream that encodes the time scale and the number of units in a clock tick syntax elements at most once in the VPS syntax structure. In some instances, the video decoder 76 may test the encoded bitstream for conformance by decoding the encoded bitstream to determine the time scale and the number of units in a clock tick from a VUI syntax structure of the encoded bitstream that encodes the time scale and the number of units in a clock tick syntax elements at most once in the VUI syntax structure. The time scale and number of units in a clock tick may be signaled other than in an HRD parameters syntax structure incorporated within the VPS and/or VUI syntax structure. Video decoder 76 may use the determined time scale and the determined number of units in a clock tick as input for, e.g., determining CPB 78 underflow or overflow during decoding of encoded pictures included in the encoded bitstream.

In another example, the video decoder 76 may receive a representation of the encoded bitstream generated by video encoder 20 to signal, in a VPS syntax structure of syntax elements 55 for one or more coded video sequences, a POC proportional to timing indication flag. The video decoder 76 may test the encoded bitstream for conformance by decoding the encoded bitstream to determine a value for the flag. The video decoder 76 may additionally, or alternatively, test an encoded bitstream, generated by video decoder 76 to signal the flag in the VPS syntax structure only if the time scale and number of units in a clock tick syntax elements are also included. The video decoder 76 may use the determined value of the POC proportional to timing indication flag and the time scale and number of units in a clock tick syntax elements as input for, e.g., determining CPB 78 underflow or overflow during decoding of encoded pictures included in the encoded bitstream.

Figure 4:
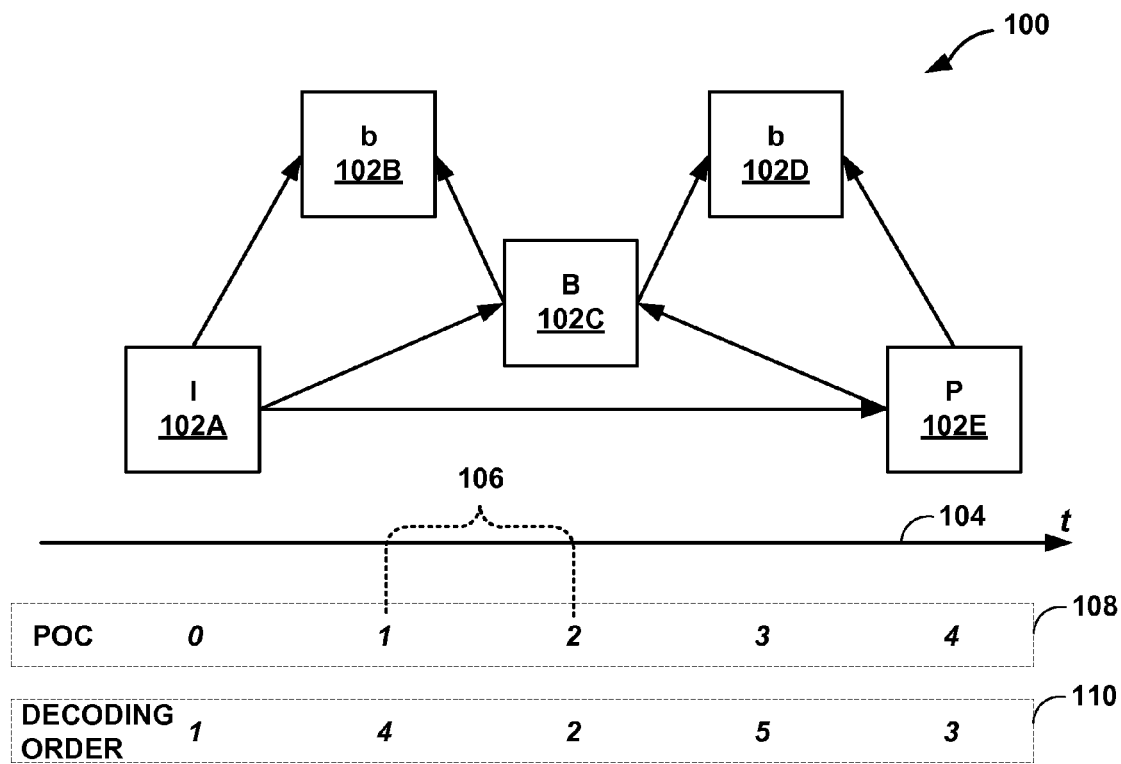
FIG. 4 is a block diagram illustrating timing information for an example coding structure for a reference picture set according to techniques described herein.

FIG. 4 is a block diagram illustrating an example coding structure 100 for a reference picture set. The coding structure 100 includes slices 102A-102E (collectively, "slices 102"). Picture order count 108 associated with the coding structure 100 denotes the output order of the corresponding slice in the reference picture set. For example, I-slice 102A is to be output first (POC value 0) while b-slice 102B is to be output second (POC value 1). Decoding order 110 associated with the coding structure 100 denotes the decoding order for the corresponding slice in the reference picture set. For example, I-slice 102A is to be output first (decoding order 1) while b-slice 102B is to be output second (decoding order 2).

Arrow 104 indicates an output time for the pictures along a time continuum t. Time interval 106 represents a time interval corresponding to a difference of picture order count (POC) values equal to 1. The time interval 106 may include a number of clock ticks, which may depend upon the time scale (corresponding, e.g., to an oscillator frequency—such as 27 MHz—that defines a time coordinate system for the signaled information) and the number of time units of a clock operating at the time scale that corresponds to one increment of a clock tick counter, which is referred to as a "clock tick." In accordance with techniques described herein, a video encoder 20 may generate a bitstream to directly signal, in the video parameter set (VPS) syntax structure or in the video usability information (VUI) part of the sequence parameter set (SPS) syntax structure for a coded video sequence, syntax elements that define a condition for signaling a number of clock ticks corresponding to a difference of picture order count (POC) values equal to 1.

Figure 5:
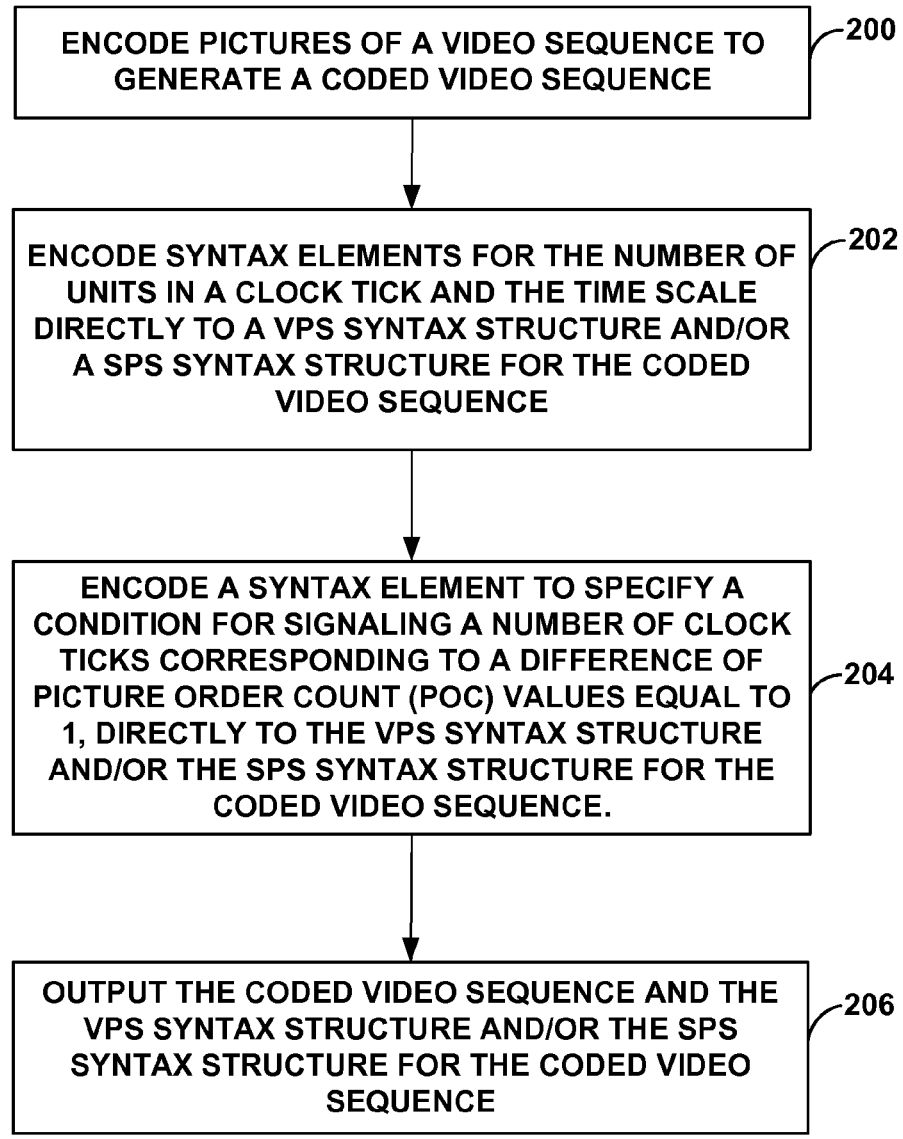
FIG. 5 is a flowchart illustrating an example method of operation according to techniques described in this disclosure.

FIG. 5 is a flowchart illustrating an example method of operation according to techniques described in this disclosure. A video encoder 20 encodes pictures of a video sequence to generate a coded video sequence (200). The video encoder 20 additionally generates parameter sets for the coded video sequence. The parameter sets may include parameters encoded according to a sequence parameter set (SPS) syntax structure and/or according to a video parameter set (VPS) syntax structure. According to techniques described herein, the video encoder 20 encodes syntax elements for the number of units in a clock tick and the time scale directly to the VPS syntax structure and/or directly to the SPS syntax structure for the coded video sequence (202). The term "directly" indicates that such encoding may be generated without incorporating, in the VPS syntax structure or SPS syntax structure (as applicable), the syntax elements for the number of units in a clock tick and the time scale defined for a separate parameter set syntax structure, such as that corresponding to the hypothetical reference decoder (HRD) parameter set as defined in HEVC WD9.

In addition, the video encoder 20 encodes, directly to the VPS syntax structure and/or SPS syntax structure of the coded video sequence, a condition for signaling a number of clock ticks corresponding to a difference of picture order count (POC) values equal to one (204). The condition may include one or more syntax elements that represent variables for a Boolean formula, in which case video encoder 20 may encode each such syntax element directly to the VPS syntax structure and/or SPS syntax structure of the coded video sequence. The video encoder 20 outputs the coded video sequence and the VPS syntax structure and/or the SPS syntax structure for the coded video sequence (206). In some cases, the video encoder 20 outputs these structures to a HRD of the video encoder 20.

Figure 6A:
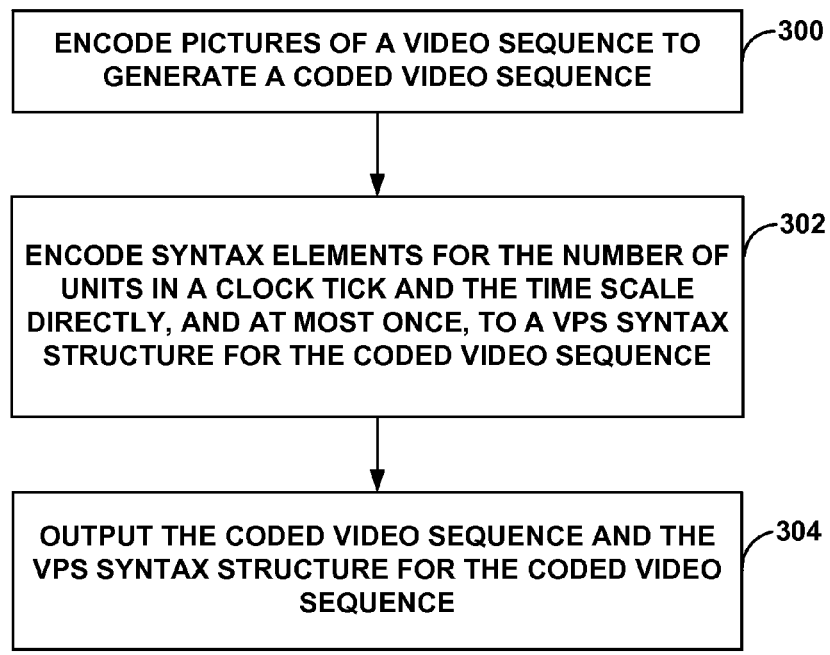
FIGS. 6A-6B are flowcharts illustrating example methods of operation according to techniques described in this disclosure.
Figure 6B:
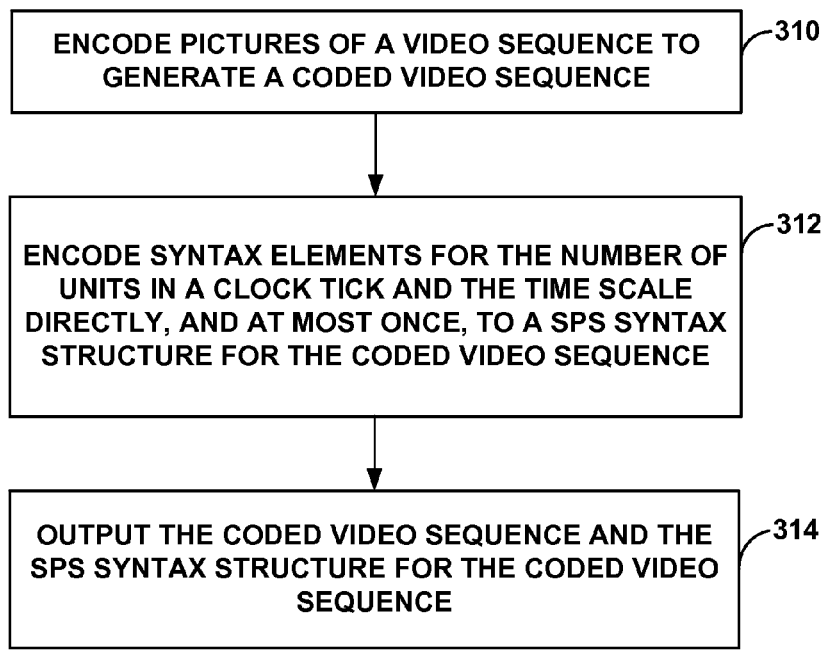

FIGS. 6A-6B are flowcharts illustrating example methods of operation according to techniques described in this disclosure. In FIG. 6A, a video encoder 20 encodes pictures of a video sequence to generate a coded video sequence (300). The video encoder 20 additionally generates parameter sets for the coded video sequence. The parameter sets may include parameters encoded according to a video parameter set (VPS) syntax structure. According to techniques described herein, the video encoder 20 encodes syntax elements for the number of units in a clock tick and the time scale directly, and at most once, to a VPS syntax structure for the coded video sequence (302). In some instances, even in cases in which the VPS syntax structure includes multiple instances of HRD parameters, by encoding the syntax elements directly to the VPS syntax structure (at most once) and not to the HRD parameter sets (or any other incorporated parameter set syntax structure), the VPS syntax structure may include a single syntax element for each of the number of units in a clock tick and the time scale. The video encoder 20 outputs the coded video sequence and the VPS syntax structure for the coded video sequence (304). In some cases, the video encoder 20 outputs these structures to a HRD of the video encoder 20.

In FIG. 6B, a video encoder 20 encodes pictures of a video sequence to generate a coded video sequence (310). The video encoder 20 additionally generates parameter sets for the coded video sequence. The parameter sets may include parameters encoded according to a video parameter set (SPS) syntax structure. According to techniques described herein, the video encoder 20 encodes syntax elements for the number of units in a clock tick and the time scale directly, and at most once, to a SPS syntax structure for the coded video sequence (312). In some instances, even in cases in which the SPS syntax structure includes multiple instances of HRD parameters, by encoding the syntax elements directly to the SPS syntax structure (at most once) and not to the HRD parameter sets (or any other incorporated parameter set syntax structure), the SPS syntax structure may include a single syntax element for each of the number of units in a clock tick and the time scale. The video encoder 20 outputs the coded video sequence and the SPS syntax structure for the coded video sequence (314). In some cases, the video encoder 20 outputs these structures to a HRD of the video encoder 20. In some instances, video encoder 20 may encode the syntax elements for the number of units in a clock tick and the time scale to both a VPS syntax structure and an SPS syntax structure for the coded video sequence.

Figure 7:
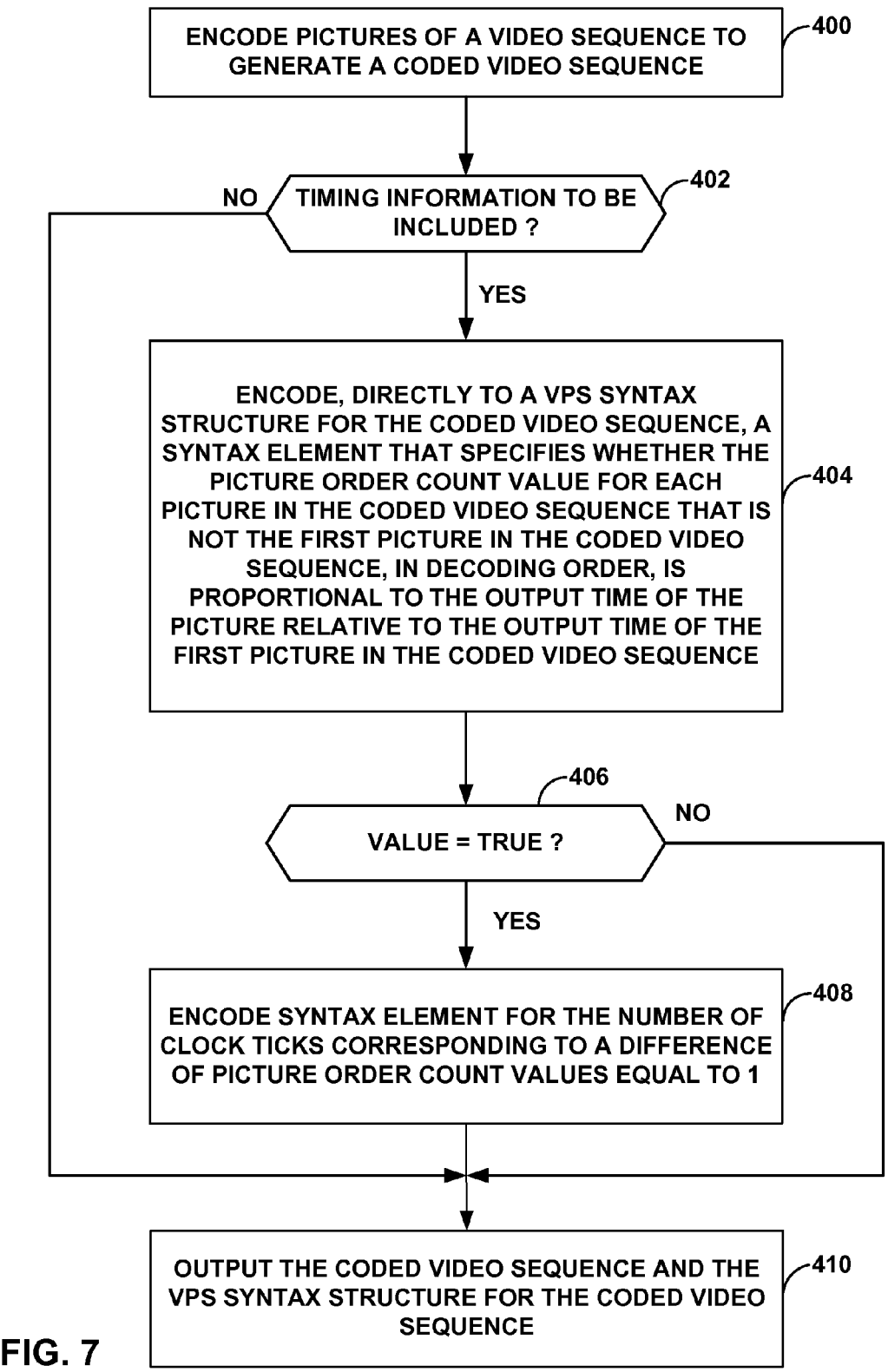
FIG. 7 is a flowchart illustrating an example method of operation according to techniques described in this disclosure.

FIG. 7 is a flowchart illustrating an example method of operation according to techniques described in this disclosure. A video encoder 20 encodes pictures of a video sequence to generate a coded video sequence (400). The video encoder 20 additionally generates parameter sets for the coded video sequence. The parameter sets may include parameters encoded according to a video parameter set (VPS) syntax structure. If timing information is to be included, e.g., for defining a HRD buffering model (YES branch of 402), the video encoder 20 encodes, directly to A VPS syntax structure for the coded video sequence, a syntax element having a value that specifies whether the picture order count (POC) value for each picture in the coded video sequence that is not the first picture in the coded video sequence, in decoding order, is proportional to the output time of the picture relative to the output time of the first picture in the coded video sequence (404). The syntax element may be semantically similar to the poc_proportional_to_timing_flag defined by HEVC WD9. The timing information may represent the number of units in a clock tick and the time scale.

If the value of the syntax element is true (YES branch of 406), the video encoder 20 also encodes a syntax element for the number of clock ticks corresponding to a difference of picture order count values equal to one (408). Because the video encoder 20 encodes the syntax elements to the VPS, the values of the syntax elements may apply to all layers or all possible bitstream subsets of a scalable video bitstream, for the VPS represents the highest layer parameter set and describes the overall characteristics of coded picture sequences.

If the timing information is not to be included in the VPS syntax structure (NO branch of 402), the video encoder 20 encodes neither the syntax element for indicating the POC is proportional to the timing information nor the syntax element for the number of clock ticks corresponding to a difference of picture order count values equal to one. If the POC is not proportional to the timing information (i.e., the value is false) (NO branch of 406), the video encoder 20 does not encode the syntax element for the number of clock ticks corresponding to a difference of picture order count values equal to one.

The video encoder 20 outputs the coded video sequence and the VPS syntax structure for the coded video sequence (410). In some cases, the video encoder 20 outputs these structures to a HRD of the video encoder 20.

Figure 8:
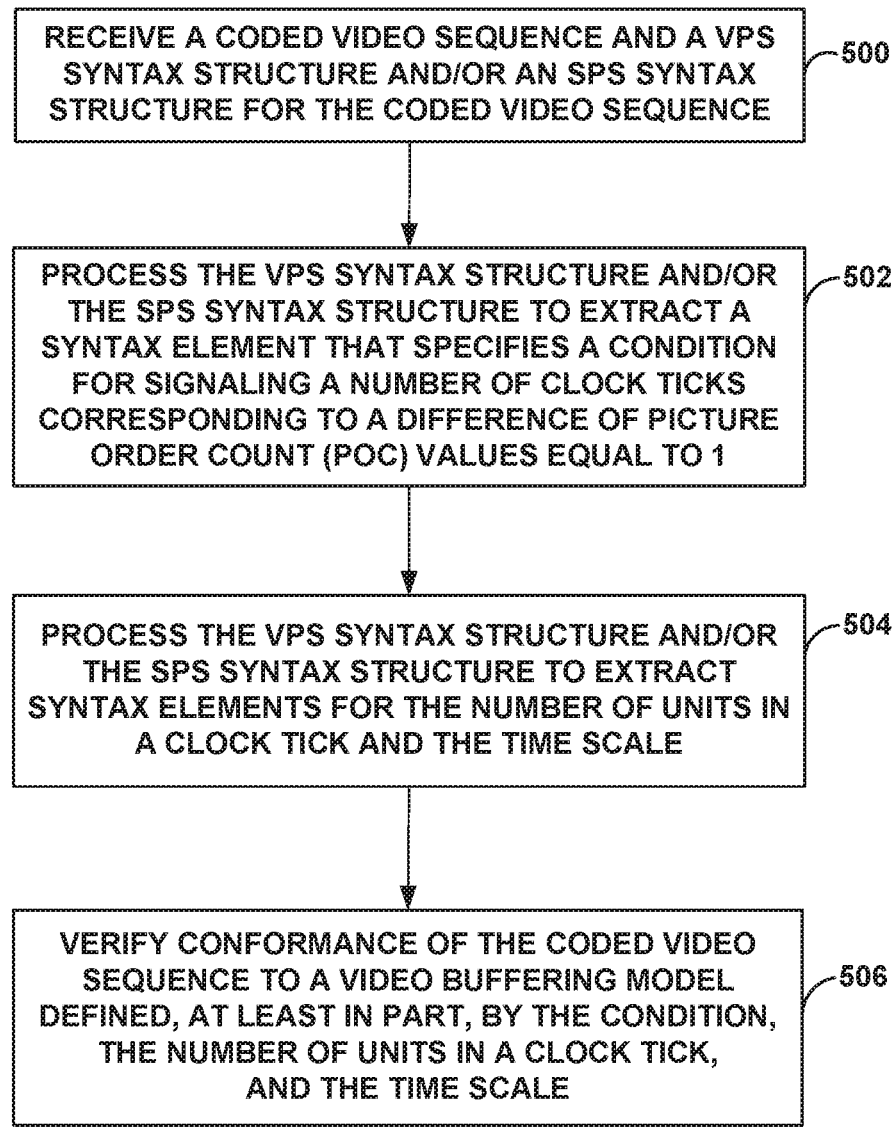
FIG. 8 is a flowchart illustrating an example method of operation according to techniques described in this disclosure.

FIG. 8 is a flowchart illustrating an example method of operation according to techniques described in this disclosure. A video decoder device 30 or hypothetical reference decoder 57 of a video encoder device 20 (hereinafter, "the decoder") receives a coded video sequence and a video parameter set (VPS) syntax structure and/or a sequence parameter set (SPS) syntax structure for the coded video sequence (500). The coded video sequence and/or the syntax structure(s) may be encoded to a bitstream that includes one or more encoded pictures.

The decoder processes the VPS syntax structure and/or the SPS syntax structure to extract a syntax element that specifies, directly in the VPS syntax structure and/or the SPS syntax structure, a condition for signaling a number of clock ticks corresponding to a difference of picture order count (POC) values equal to one (502). The condition may include one or more syntax elements that represent variables for a Boolean formula, in which case the decoder may process each such syntax element directly from the VPS syntax structure and/or SPS syntax structure of the coded video sequence.

The decoder additionally processes the VPS syntax structure and/or the SPS syntax structure to extract syntax elements for the number of units in a clock tick and the time scale directly from the VPS syntax structure and/or directly from the SPS syntax structure for the coded video sequence (504). The decoder may then verify conformance of the coded video sequence to a video buffering model that is defined, at least in part, by the values for the condition, the number of units in a clock tick, and the time scale as extracted from the VPS syntax structure and/or the SPS syntax structure and as read from the corresponding syntax elements (506).

Figure 9A:
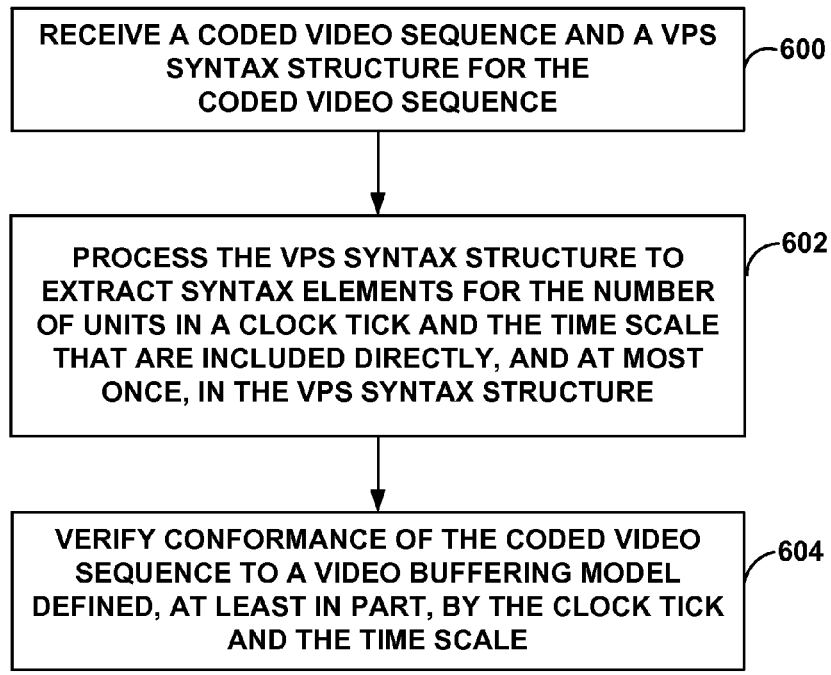
FIGS. 9A-9B are flowcharts illustrating example methods of operation according to techniques described in this disclosure.
Figure 9B:
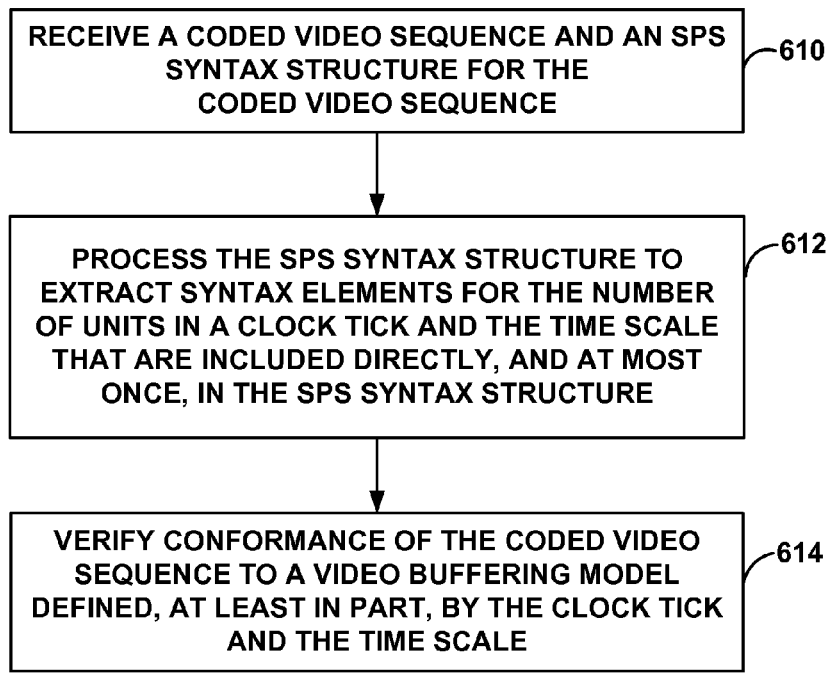

FIGS. 9A-9B are flowcharts illustrating example methods of operation according to techniques described in this disclosure. In FIG. 9A, a video decoder device 30 or hypothetical reference decoder 57 of a video encoder device 20 (hereinafter, "the decoder") receives a coded video sequence and a video parameter set (VPS) syntax structure for the coded video sequence (600). The coded video sequence and/or the VPS syntax structure may be encoded to a bitstream that includes one or more encoded pictures.

According to techniques described herein, the decoder processes the VPS syntax structure to extract syntax elements for the number of units in a clock tick and the time scale that occur directly, and at most once, in the VPS syntax structure for the coded video sequence (602). The decoder may then verify conformance of the coded video sequence to a video buffering model that is defined, at least in part, by the values for the number of units in a clock tick and the time scale as extracted from the VPS syntax structure and as read from the corresponding syntax elements (604).

In FIG. 9B, the decoder receives a coded video sequence and a video parameter set (SPS) syntax structure for the coded video sequence (610). The coded video sequence and/or the SPS syntax structures may be encoded to a bitstream that includes one or more encoded pictures.

According to techniques described herein, the decoder processes the SPS syntax structure to extract syntax elements for the number of units in a clock tick and the time scale that are occur directly, and at most once, in the SPS syntax structure for the coded video sequence (612). The decoder may then verify conformance of the coded video sequence to a video buffering model that is defined, at least in part, by the values for the number of units in a clock tick and the time scale as extracted from the SPS syntax structure and as read from the corresponding syntax elements (614).

Figure 10:
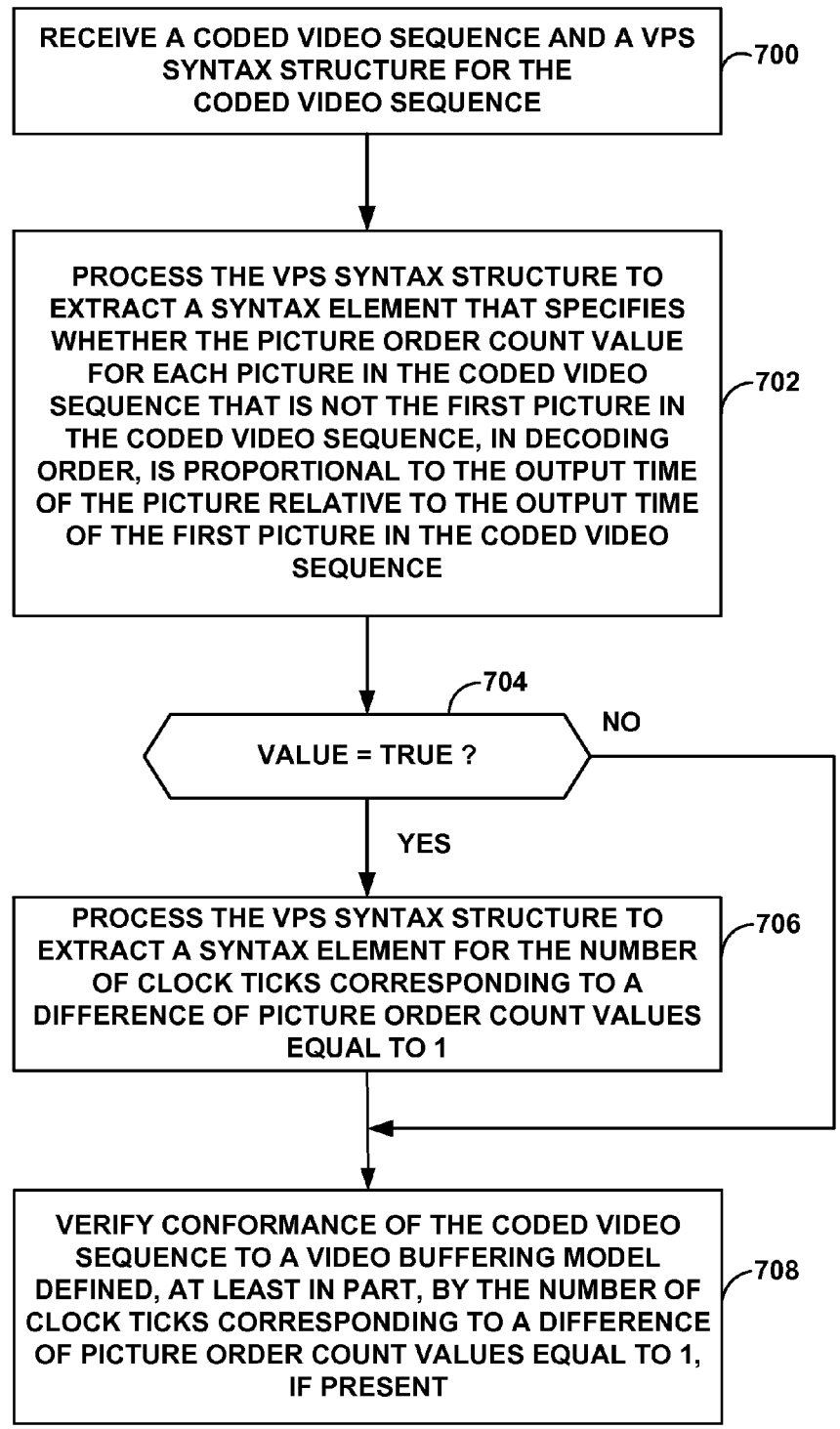
FIG. 10 is a flowchart illustrating an example method of operation according to techniques described in this disclosure.

FIG. 10 is a flowchart illustrating an example method of operation according to techniques described in this disclosure. In FIG. 10, a video decoder device 30 or hypothetical reference decoder 57 of a video encoder device 20 (hereinafter, "the decoder") receives a coded video sequence and a video parameter set (VPS) syntax structure for the coded video sequence (700). The coded video sequence and/or the VPS syntax structure may be encoded to a bitstream that includes one or more encoded pictures.

The decoder processes the VPS syntax structure to extract a syntax element that specifies whether the picture order count value for each picture in the coded video sequence that is not the first picture in the coded video sequence, in decoding order, is proportional to the output time of the picture relative to the output time of the first picture in the coded video sequence (702). If the value for the syntax element is true, then the decoder further processes the VPS syntax structure to extract a syntax element for the number of clock ticks corresponding to a difference of picture order count values equal to one (706). The decoder may then verify conformance of the coded video sequence to a video buffering model that is defined, at least in part, by the value for the number of clock ticks corresponding to a difference of picture order count values equal to one extracted from the VPS syntax structure and as read from the corresponding syntax element (708).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, Flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing video data, the method comprising:
    receiving a coded video sequence comprising encoded pictures of a video sequence; and
    receiving timing parameters for the coded video sequence that include a first syntax element in a video parameter set (VPS) syntax structure referenced by the coded video sequence that provides a time scale and a second syntax element in the VPS syntax structure that provides a number of units in a clock tick, the first and second syntax elements in the VPS syntax structure included directly and at most once in the VPS syntax structure and applicable to all layers specified by the VPS syntax structure,
    wherein the timing parameters for the coded video sequence include a first syntax element in a video usability information (VUI) part of a sequence parameter set (SPS) syntax structure referenced by the coded video sequence that provides the time scale and a second syntax element in the VUI part of the SPS syntax structure that provides the number of units in a clock tick, the first and second syntax elements in the VUI part of the SPS syntax structure included directly and at most once in the VUI part of the SPS syntax structure and applicable to all layers that are within the coded video sequence and that reference the SPS syntax structure.

2. The method of claim 1, wherein receiving the timing parameters for the coded video sequence comprises receiving the time scale and the number of units in a clock tick in the VPS syntax structure.

3. The method of claim 2, wherein the first syntax element in the VPS syntax structure comprises a vps_time_scale syntax element and the second syntax element in the VPS syntax structure comprises a vps_num_units_in_tick syntax element.

4. The method of claim 1, wherein receiving the timing parameters for the coded video sequence comprises receiving the time scale and the number of units in a clock tick in the VUI part of the SPS syntax structure.

5. The method of claim 4, wherein the first syntax element in the VUI part of the SPS syntax structure comprises a sps_time_scale syntax element and the second syntax element in the VUI part of the SPS syntax structure comprises a sps_num_units_in_tick syntax element.

6. The method of claim 1, wherein the first and second syntax elements in the VPS syntax structure are not signaled in a hypothetical reference decoder (HRD) parameters syntax structure incorporated into the VPS syntax structure.

7. The method of claim 1, wherein the first and second syntax elements in the VUI part of the SPS syntax structure are not signaled in a hypothetical reference decoder (HRD) parameters syntax structure incorporated into the VUI part of the SPS syntax structure.

8. The method of claim 1, wherein receiving the coded video sequence comprises receiving a coded bitstream comprising a sequence of bits that forms a representation of the encoded pictures, the method further comprising:
    verifying conformance of the bitstream to a video buffering model of a coded picture buffer and a decoded picture buffer defined, at least in part, by the time scale and the number of units in a clock tick.

9. The method of claim 1, wherein the timing parameters comprise timing parameters for hypothetical reference decoding operations.

10. A method of encoding video data, the method comprising:
- encoding pictures of a video sequence to generate a coded video sequence comprising the encoded pictures; and
- signaling timing parameters for the coded video sequence by at least in part signaling a first syntax element in a video parameter set (VPS) syntax structure referenced by the coded video sequence that provides a time scale and a second syntax element in the VPS syntax structure that provides a number of units in a clock tick, the first and second syntax elements in the VPS syntax structure included directly and at most once in the VPS syntax structure and applicable to all layers specified by the VPS syntax structure, and by at least in part signaling a first syntax element in a video usability information (VUI) part of a sequence parameter set (SPS) syntax structure referenced by the coded video sequence that provides the time scale and a second syntax element in the VUI part of the SPS syntax structure that provides the number of units in a clock tick, the first and second syntax elements in the VUI part of the SPS syntax structure included directly and at most once in the VUI part of the SPS syntax structure and applicable to all layers that are within the coded video sequence and that reference the SPS syntax structure.

11. The method of claim 10, wherein the first syntax element in the VPS syntax structure comprises a vps_time_scale syntax element and the second syntax element in the VPS syntax structure comprises a vps_num_units_in_tick syntax element.

12. The method of claim 10, wherein the first syntax element in the VUI part of the SPS syntax structure comprises a sps_time_scale syntax element and the second syntax element in the VUI part of the SPS syntax structure comprises a sps_num_units_in_tick syntax element.

13. The method of claim 10, wherein the first and second syntax elements in the VPS syntax structure are not signaled in a hypothetical reference decoder (HRD) parameters syntax structure incorporated into the VPS syntax structure.

14. The method of claim 10, wherein the first and second syntax elements in the VUI part of the SPS syntax structure are not signaled in a hypothetical reference decoder (HRD) parameters syntax structure incorporated into the SPS syntax structure.

15. The method of claim 10, further comprising:
- generating a coded bitstream comprising a sequence of bits that forms a representation of the encoded pictures,
- wherein the timing parameters define, at least in part, a video buffering model of a coded picture buffer and a decoded picture buffer for verifying conformance of the bitstream.

16. The method of claim 10, wherein the timing parameters comprise timing parameters for hypothetical reference decoding operations.

17. A device for processing video data, the device comprising:
- a memory configured to store the video data; and
- a processor in communication with the memory and configured to:
  - receive a coded video sequence comprising encoded pictures of a video sequence; and
  - receive timing parameters for the coded video sequence that include a first syntax element in a video parameter set (VPS) syntax structure referenced by the coded video sequence that provides a time scale and a second syntax element in the VPS syntax structure that provides a number of units in a clock tick, the first and second syntax elements in the VPS syntax structure included directly and at most once in the VPS syntax structure and applicable to all layers specified by the VPS syntax structure,
  - wherein the timing parameters for the coded video sequence include a first syntax element in a video usability information (VUI) part of a sequence parameter set (SPS) syntax structure referenced by the coded video sequence that provides the time scale and a second syntax element in the VUI part of the SPS syntax structure that provides the number of units in a clock tick, the first and second syntax elements in the VUI part of the SPS syntax structure included directly and at most once in the VUI part of the SPS syntax structure and applicable to all layers that are within the coded video sequence and that reference the SPS syntax structure.

18. The device of claim 17, wherein to receive the timing parameters for the coded video sequence the processor is further configured to receive the time scale and the number of units in a clock tick in the VPS syntax structure.

19. The device of claim 18, wherein the first syntax element in the VPS syntax structure comprises a vps_time_scale syntax element and the second syntax element in the VPS syntax structure comprises a vps_num_units_in_tick syntax element.

20. The device of claim 17, wherein to receive the timing parameters for the coded video sequence the processor is further configured to receive the time scale and the number of units in a clock tick in the VUI part of the SPS syntax structure.

21. The device of claim 20, wherein the first syntax element in the VUI part of the SPS syntax structure comprises a sps_time_scale syntax element and the second syntax element in the VUI part of the SPS syntax structure comprises a sps_num_units_in_tick syntax element.

22. The device of claim 17, wherein the first and second syntax elements in the VPS syntax structure are not signaled in a hypothetical reference decoder (HRD) parameters syntax structure incorporated into the VPS syntax structure.

23. The device of claim 17, wherein the first and second syntax elements in the VUI part of the SPS syntax structure are not signaled in a hypothetical reference decoder (HRD) parameters syntax structure incorporated into the VUI part of the SPS syntax structure.

24. The device of claim 17,
- wherein to receive the coded video sequence the processor is further configured to receive the coded bitstream comprising a sequence of bits that forms a representation of the encoded pictures, and
- wherein the processor is further configured to verify conformance of the bitstream to a video buffering model of a coded picture buffer and a decoded picture buffer defined, at least in part, by the time scale and the number of units in a clock tick.

25. The device of claim 17, wherein the timing parameters comprise timing parameters for hypothetical reference decoding operations.

26. A device for encoding video data, the device comprising:
- a memory configured to store the video data; and
- a processor in communication with the memory and configured to:
  - encode pictures of a video sequence to generate a coded video sequence comprising the encoded pictures; and
  - signal timing parameters for the coded video sequence by at least in part signaling a first syntax element in a video parameter set (VPS) syntax structure referenced by the coded video sequence that provides a time scale and a second syntax element in the VPS syntax structure that provides a number of units in a clock tick, the first and second syntax elements in the VPS syntax structure included directly and at most once in the VPS syntax structure and applicable to all layers specified by the VPS syntax structure, and by at least in part signaling a first syntax element in a video usability information (VUI) part of a sequence parameter set (SPS) syntax structure referenced by the coded video sequence that provides the time scale and a second syntax element in the VUI part of the SPS syntax structure that provides the number of units in a clock tick, the first and second syntax elements in the VUI part of the SPS syntax structure included directly and at most once in the VUI part of the SPS syntax structure and applicable to all layers that are within the coded video sequence and that reference the SPS syntax structure.

27. The device of claim 26, wherein the first syntax element in the VPS syntax structure comprises a vps_time_scale syntax element and the second syntax element in the VPS syntax structure comprises a vps_num_units_in_tick syntax element.

28. The device of claim 26, wherein the first syntax element in the VUI part of the SPS syntax structure comprises a sps_time_scale syntax element and the second syntax element in the VUI part of the SPS syntax structure comprises a sps_num_units_in_tick syntax element.

29. The device of claim 26, wherein the first and second syntax elements in the VPS syntax structure are not signaled in a hypothetical reference decoder (HRD) parameters syntax structure incorporated into the VPS syntax structure.

30. The device of claim 26, wherein the first and second syntax elements in the VUI part of the SPS syntax structure are not signaled in a hypothetical reference decoder (HRD) parameters syntax structure incorporated into the SPS syntax structure.

31. The device of claim 26,
wherein the processor is further configured to generate a coded bitstream comprising a sequence of bits that forms a representation of the encoded pictures,
wherein the timing parameters define, at least in part, a video buffering model of a coded picture buffer and a decoded picture buffer for verifying conformance of the bitstream.

32. The device of claim 26, wherein the timing parameters comprise timing parameters for hypothetical reference decoding operations.

33. A device for processing video data comprising:
means for receiving a coded video sequence comprising encoded pictures of a video sequence; and
means for receiving timing parameters for the coded video sequence that include a first syntax element in a video parameter set (VPS) syntax structure referenced by the coded video sequence that provides a time scale and a second syntax element in the VPS syntax structure that provides a number of units in a clock tick, the first and second syntax elements in the VPS syntax structure included directly and at most once in the VPS syntax structure and applicable to all layers specified by the VPS syntax structure,
wherein the timing parameters for the coded video sequence include a first syntax element in a video usability information (VUI) part of a sequence parameter set (SPS) syntax structure referenced by the coded video sequence that provides the time scale and a second syntax element in the VUI part of the SPS syntax structure that provides the number of units in a clock tick, the first and second syntax elements in the VUI part of the SPS syntax structure included directly and at most once in the VUI part of the SPS syntax structure and applicable to all layers that are within the coded video sequence and that reference the SPS syntax structure.

34. The device of claim 33, wherein the means for receiving the timing parameters for the coded video sequence comprise means for receiving the time scale and the number of units in a clock tick in the VPS syntax structure.

35. The device of claim 34, wherein the first syntax element in the VPS syntax structure comprises a vps_time_scale syntax element and the second syntax element in the VPS syntax structure comprises a vps_num_units_in_tick syntax element.

36. The device of claim 33, wherein the means for receiving the timing parameters for the coded video sequence comprise means for receiving the time scale and the number of units in a clock tick in the VUI part of the SPS syntax structure.

37. The device of claim 36, wherein the first syntax element in the VUI part of the SPS syntax structure comprises a sps_time_scale syntax element and the second syntax element in the VUI part of the SPS syntax structure comprises a sps_num_units_in_tick syntax element.

38. A non-transitory computer readable storage medium storing instructions for processing video data that upon execution by one or more processors cause the one or more processors to:
receive a coded video sequence comprising encoded pictures of a video sequence; and
receive timing parameters for the coded video sequence that include a first syntax element in a video parameter set (VPS) syntax structure referenced by the coded video sequence that provides a time scale and a second syntax element in the VPS syntax structure that provides a number of units in a clock tick, the first and second syntax elements in the VPS syntax structure included directly and at most once in the VPS syntax structure and applicable to all layers specified by the VPS syntax structure,
wherein the timing parameters for the coded video sequence include a first syntax element in a video usability information (VUI) part of a sequence parameter set (SPS) syntax structure referenced by the coded video sequence that provides the time scale and a second syntax element in the VUI part of the SPS syntax structure that provides the number of units in a clock tick, the first and second syntax elements in the VUI part of the SPS syntax structure included directly and at most once in the VUI part of the SPS syntax structure and applicable to all layers that are within the coded video sequence and that reference the SPS syntax structure.

39. The non-transitory readable storage medium of claim 38, wherein to receive the timing parameters for the coded video sequence the instructions further cause the one or more processors to receive the time scale and the number of units in a clock tick in the VPS syntax structure.

40. The non-transitory readable storage medium of claim 39, wherein the first syntax element in the VPS syntax structure comprises a vps_time_scale syntax element and the second syntax element in the VPS syntax structure comprises a vps_num_units_in_tick syntax element.

41. The non-transitory readable storage medium of claim 38, wherein to receive the timing parameters for the coded video sequence the instructions further cause the one or more processors to receive the time scale and the number of units in a clock tick in the VUI part of the SPS syntax structure.

42. The non-transitory readable storage medium of claim 41, wherein the first syntax element in the VUI part of the SPS syntax structure comprises a sps_time_scale syntax element and the second syntax element in the VUI part of the SPS syntax structure comprises a sps_num_units_in_tick syntax element.

43. The method of claim 1, wherein the VPS syntax structure specifies a plurality of layers.

44. The method of claim 10, wherein the VPS syntax structure specifies a plurality of layers.

45. The device of claim 17, wherein the VPS syntax structure specifies a plurality of layers.

46. The device of claim 26, wherein the VPS syntax structure specifies a plurality of layers.

47. The device of claim 33, wherein the VPS syntax structure specifies a plurality of layers.

48. The non-transitory readable storage medium of claim 38, wherein the VPS syntax structure specifies a plurality of layers.

* * * * *